(12) United States Patent
Rahman et al.

(10) Patent No.: US 11,877,246 B2
(45) Date of Patent: *Jan. 16, 2024

(54) UPLINK POWER CONTROL FOR SRS CARRIER-BASED SWITCHING

(71) Applicant: Telefonaktiebolaget LM Ericsson (publ), Stockholm (SE)

(72) Inventors: Imadur Rahman, Sollentuna (SE); Iana Siomina, Täby (SE); Muhammad Ali Kazmi, Sundbyberg (SE); Christian Bergljung, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/874,586

(22) Filed: Jul. 27, 2022

(65) Prior Publication Data
US 2022/0369238 A1 Nov. 17, 2022

Related U.S. Application Data

(63) Continuation of application No. 17/212,501, filed on Mar. 25, 2021, now Pat. No. 11,432,246, which is a (Continued)

(51) Int. Cl.
*H04W 52/14* (2009.01)
*H04W 52/22* (2009.01)
(Continued)

(52) U.S. Cl.
CPC ......... *H04W 52/146* (2013.01); *H04W 52/22* (2013.01); *H04W 52/54* (2013.01); *H04W 52/325* (2013.01)

(58) Field of Classification Search
CPC ............. H04W 52/146; H04W 52/241; H04W 52/325; H04W 52/54; H04W 72/0446;
(Continued)

(56) References Cited

U.S. PATENT DOCUMENTS

2007/0030838 A1* 2/2007 Kaikkonen ......... H04W 52/325
370/342
2010/0234037 A1 9/2010 Terry et al.
(Continued)

FOREIGN PATENT DOCUMENTS

| CN | 102934498 A | 2/2013 |
|---|---|---|
| CN | 102934498 B | 5/2016 |
| WO | 2016071741 A1 | 5/2016 |

OTHER PUBLICATIONS

Fujitsu: "Discussion on SRS Power Control", 3GPP Draft; R1-123302, 3rd Generation Partnership Project (3GPP), Mobile Competence Centre ; 650, Route Des Lucioles; F-06921 Sophia-Antipolis Cedex;France, vol. RAN WG1, No. Qingdao, China; Aug. 13, 2012-Aug. 17, 2012 Aug. 5, 2012 (Aug. 5, 2012), XP050661190.*
(Continued)

*Primary Examiner* — Golam Sorowar
(74) *Attorney, Agent, or Firm* — Withrow & Terranova, PLLC

(57) ABSTRACT

According to some embodiments, a method for use in a user equipment (UE) operable to transmit a sounding reference signal (SRS) on a plurality of carriers comprises: obtaining an indication to perform SRS carrier-based switching for a carrier; adapting a parameter for uplink transmit power control in response to the obtained indication; and transmitting an uplink signal using the adapted parameter while meeting at least one predetermined uplink power control requirement. According to some embodiments, a method for use in a network node operable to receive a SRS on a plurality of carriers comprises: sending, to a UE, an indication to perform SRS carrier-based switching for a carrier; and receiving, from the UE, an uplink signal based on the parameter for uplink transmit power control adapted in
(Continued)

response to the sent indication, wherein the uplink signal meets at least one uplink power control requirement.

23 Claims, 9 Drawing Sheets

Related U.S. Application Data continuation of application No. 16/097,190, filed as application No. PCT/IB2017/052802 on May 12, 2017, now Pat. No. 10,986,582.

(60) Provisional application No. 62/336,357, filed on May 13, 2016.

(51) Int. Cl.
*H04W 52/54* (2009.01)
*H04W 52/32* (2009.01)

(58) Field of Classification Search
CPC ... H04W 24/10; H04W 52/16; H04W 52/244; H04W 52/34; H04W 52/367; H04W 52/38; H04W 52/50; H04W 72/0413; H04W 72/042; H04W 72/0473; H04W 74/0808; H04L 5/0055; H04L 1/1812; H04L 5/0048; H04L 1/0026; H04L 1/1692; H04L 1/1854; H04L 1/1861; H04L 25/0204; H04L 25/0224; H04L 5/00; H04L 5/001; H04L 5/0051; H04L 5/006; H04L 5/0094
See application file for complete search history.

(56) References Cited

U.S. PATENT DOCUMENTS

| | | | |
|---|---|---|---|
| 2010/0267413 A1 | 10/2010 | Izuka et al. | |
| 2012/0155337 A1 | 6/2012 | Park | |
| 2013/0010659 A1 | 1/2013 | Chen et al. | |
| 2013/0195084 A1 | 8/2013 | Chen et al. | |
| 2015/0271816 A1* | 9/2015 | Akkarakaran | H04L 5/0055 370/336 |
| 2017/0318607 A1* | 11/2017 | Tiirola | H04L 27/0006 |
| 2019/0141639 A1 | 5/2019 | Rahman et al. | |

OTHER PUBLICATIONS

3GPP TS 36.101 V13.3.0, "3rd Generation Partnership Project; Technical Specification Group Radio Access Network; Evolved Universal Terrestrial Radio Access (E-UTRA); User Equipment (UE) radio transmission and reception Release 13)," Section 6, Mar. 2016, 928 pages.
First Office Action for Chinese Patent Application No. 201780029199. 2, dated Nov. 10, 2020, 15 pages.
3GPP TS 36.212 V14.10.0, "3rd Generation Partnership Project; Technical Specification Group Radio Access Network; Evolved Universal Terrestrial Radio Access (E-UTRA); Multiplexing and channel coding (Release 14)," Jun. 2019, 200 pages.
3GPP TS 36.213 V14.12.0, "3rd Generation Partnership Project; Technical Specification Group Radio Access Network; Evolved Universal Terrestrial Radio Access (E-UTRA); Physical layer procedures (Release 14)," Sep. 2019, 468 pages.
3GPP TS 36.331 V14.12.0, "3rd Generation Partnership Project; Technical Specification Group Radio Access Network; Evolved Universal Terrestrial Radio Access (E-UTRA); Radio Resource Control (RRC); Protocol specification (Release 14)," Sep. 2019, 783 pages.
Fujitsu, "Discussion on SRS Power Control," 3GPP TSG RAN WG1 Meeting #70, R1-123302, Aug. 13-17, 2012, Qingdao, China, 5 pages.
Non-Final Office Action for U.S. Appl. No. 16/097,190, dated Jul. 30, 2019, 23 pages.
Final Office Action for U.S. Appl. No. 16/097,190, dated Dec. 17, 2019, 24 pages.
Advisory Action for U.S. Appl. No. 16/097,190, dated Feb. 20, 2020, 4 pages.
Non-Final Office Action for U.S. Appl. No. 16/097,190, dated Jul. 13, 2020, 20 pages.
Notice of Allowance and Examiner-Initiated Interview Summary for U.S. Appl. No. 16/097,190, dated Dec. 18, 2020, 13 pages.
International Search Report and Written Opinion for International Patent Application No. PCT/IB2017/052802, dated Jul. 27, 2017, 9 pages.
Intention to Grant for European Patent Application No. 17724936.4, dated Oct. 15, 2020, 5 pages.
Non-Final Office Action for U.S. Appl. No. 17/212,501, dated Nov. 16, 2021, 45 pages.
Notice of Allowance and Examiner-Initiated Interview Summary for U.S. Appl. No. 17/212,501, dated Apr. 26, 2022, 13 pages.
Second Office Action for Chinese Patent Application No. 201780029199. 2, dated May 17, 2021, 8 pages.

* cited by examiner

UPLINK POWER CONTROL FOR SRS CARRIER-BASED SWITCHING

This application is a continuation of U.S. patent application Ser. No. 17/212,501, filed Mar. 25, 2021, now U.S. Pat. No. 11,432,246, which is a continuation of U.S. patent application Ser. No. 16/097,190, filed Oct. 26, 2018, now U.S. Pat. No. 10,986,582, which is a 35 U.S.C. § 371 national phase filing of International Application No. PCT/IB2017/052802, filed May 12, 2017, which claims priority to U.S. Provisional Application No. 62/336,357, filed May 13, 2016, the disclosures of which are incorporated herein by reference in their entireties.

TECHNICAL FIELD

Particular embodiments are directed to wireless communications and, more particularly, to methods and apparatus for assuring uplink power control accuracy during sounding reference signal (SRS) carrier-based switching.

INTRODUCTION

Third Generation Partnership Project (3GPP) long term evolution (LTE) wireless networks may use sounding reference signals (SRS). SRS are known signals that are transmitted by a user equipment (UE) so that an eNodeB can estimate different uplink-channel properties. The estimates may be used for uplink scheduling, link adaptation, and also for downlink multiple antenna transmission, particularly for time division duplex (TDD) networks where the uplink and downlink use the same frequencies. An example is illustrated in FIG. 1.

FIG. 1 illustrates an example radio subframe with SRS. The horizontal axis represents time and the other axis represents frequency. In the illustrated example, subframe 10 includes 14 orthogonal frequency division multiplexed (OFDM) symbols (illustrated as columns). SRS 16 is has a time duration of a single OFDM symbol.

A UE may transmit SRS transmitted in the last symbol of a 1 ms uplink subframe. For TDD, the UE may transmit the SRS in the special slot UpPTS. The length of UpPTS can be configured to be one or two symbols. An example is illustrated in FIG. 2.

FIG. 2 illustrates an example subframe format for TDD. The illustrated example includes one 10 ms radio frame for TDD divided into three downlink transmissions and two uplink transmissions. Up to eight symbols may be set aside for SRS. As illustrated, the special subframe UpPTS window may include up to two SRS, and the last symbol of each uplink subframe may also include an SRS.

The configuration of SRS symbols, such as SRS bandwidth, SRS frequency domain position, SRS hopping pattern, and SRS subframe configuration are set semi-statically as a part of a radio resource control (RRC) information element (IE).

LTE uplink includes two types of SRS transmission—periodic and aperiodic SRS transmission. A UE transmits periodic SRS at regular time instances as configured by RRC signaling. Aperiodic SRS is a one shot transmission that is triggered by signaling in a physical downlink control channel (PDCCH).

SRS configuration includes cell specific SRS configuration and UE specific configuration. Cell specific configuration indicates which subframes that a UE may use for SRS transmissions within the cell, as illustrated in FIG. 2 above. UE specific configuration indicates to the UE a pattern of subframes (among the subframes reserved for SRS transmission within the cell) and frequency domain resources to that the specific UE may use for SRS transmission. It also includes other parameters that the UE may use when transmitting the signal, such as frequency domain comb and cyclic shift.

SRS from different UEs can be multiplexed in the time domain by using UE-specific configurations such that the SRS of the two UEs are transmitted in different subframes. Furthermore, within the same symbol, SRS can be multiplexed in the frequency domain. The set of subcarriers is divided into two sets of subcarriers (or combs) with the even and odd subcarriers, respectively, in each such set. Additionally, UEs may have different bandwidths to get additional frequency division multiplexing (FDM). The comb enables frequency domain multiplexing of signals with different bandwidths and also overlapping. Code division multiplexing (CDM) may also be used. Using CDM, UEs can use the same time and frequency domain resources by using different shifts of a basic base sequence.

LTE networks may support carrier aggregation (CA). Many networks may carry traffic that is downlink-heavy, which results in a greater number of aggregated downlink component carriers (CC) than the number of (aggregated) uplink CCs. For existing UE categories, a typical CA capable UE only supports one or two uplink CCs.

For the carrier supporting both uplink and downlink, transmit diversity based feedback without precoding matrix indicator (PMI) and with SRS is beneficial because channel reciprocity can be used. However, a UE generally has the capability of aggregating a larger number of downlink carriers than uplink carriers. As a result, some of the TDD carriers with downlink transmission for the UE will not have an uplink transmission that includes SRS. Channel reciprocity cannot be used for these carriers. Such situations will become more severe with CA enhancement of up to 32 CCs where a large portion of CCs are TDD. Allowing fast carrier switching to and between TDD uplink carriers can be a solution to allow SRS transmission on these TDD carriers and should be supported.

SRS based carrier switching supports SRS switching to and between TDD component carrier(s). SRS based carrier switching is used where the component carriers available for SRS transmission correspond to the component carriers available for carrier aggregation of physical downlink shared channel (PDSCH), while the UE has fewer component carriers available for carrier aggregation of physical uplink shared channel (PUSCH).

3GPP TS 36.101 V13.3.0 (2016-03) defines absolute and relative power tolerance to control the uplink transmit power quality. Absolute power tolerance is the ability of a UE transmitter to set its initial output power to a specific value for the first sub-frame at the start of a contiguous transmission or non-contiguous transmission with a transmission gap larger than 20 ms. In the case of a physical random access channel (PRACH) transmission, the absolute tolerance is specified for the first preamble. The absolute power tolerance includes the channel estimation error (the absolute reference signal received power (RSRP) accuracy requirement specified in subclause 9.1 of 3GPP TS 36.133). The absolute power tolerance is ±9.0 dB in normal conditions and ±12.0 dB in extreme conditions and applies over the power range bounded by the maximum output power and the minimum output power.

The relative power tolerance is the ability of the UE transmitter to set its output power in a target sub-frame relatively to the power of the most recently transmitted reference sub-frame if the transmission gap between these sub-frames is ≤20 ms. For PRACH transmission, the relative tolerance is the ability of the UE transmitter to set its output power relatively to the power of the most recently transmitted preamble, where the measurement period for the PRACH preamble is pre-defined and is as below.

TABLE 1

PRACH ON power measurement period (TS 36.101, Table 6.3.4.2-1)

| PRACH preamble format | Measurement period (ms) |
|---|---|
| 0 | 0.9031 |
| 1 | 1.4844 |
| 2 | 1.8031 |
| 3 | 2.2844 |
| 4 | 0.1479 |

The relative transmit power tolerance depends on power step (which is set by a transmit power control (TPC) command and/or an uplink scheduling grant), a set of transmitted channels in the subframe, and conditions (normal or extreme).

TABLE 2

Relative power tolerance for transmission (normal conditions) (TS 36.101, Table 6.3.5.2.1-1)

| Power step $\Delta P$ (Up or down) [dB] | All combinations of PUSCH and PUCCH transitions [dB] | All combinations of PUSCH/PUCCH and SRS transitions between sub-frames [dB] | PRACH [dB] |
|---|---|---|---|
| $\Delta P < 2$ | ±2.5 (NOTE 3) | ±3.0 | ±2.5 |
| $2 \leq \Delta P < 3$ | ±3.0 | ±4.0 | ±3.0 |
| $3 \leq \Delta P < 4$ | ±3.5 | ±5.0 | ±3.5 |
| $4 \leq \Delta P \leq 10$ | ±4.0 | ±6.0 | ±4.0 |
| $10 \leq \Delta P < 15$ | ±5.0 | ±8.0 | ±5.0 |
| $15 \leq \Delta P$ | ±6.0 | ±9.0 | ±6.0 |

NOTE 1:
For extreme conditions an additional ± 2.0 dB relaxation is allowed
NOTE 2:
For operating bands under NOTE 2 in Table 6.2.2-1, the relative power tolerance is relaxed by increasing the upper limit by 1.5 dB if the transmission bandwidth of the reference sub-frames is confined within $F_{UL\_low}$ and $F_{UL\_low}$ + 4 MHz or $F_{UL\_high}$ − 4 MHz and $F_{UL\_high}$ and the target sub-frame is not confined within any one of these frequency ranges; if the transmission bandwidth of the target sub-frame is confined within $F_{UL\_low}$ and $F_{UL\_low}$ + 4 MHz or $F_{UL\_high}$ − 4 MHz and $F_{UL\_high}$ and the reference sub-frame is not confined within any one of these frequency ranges, then the tolerance is relaxed by reducing the lower limit by 1.5 dB.
NOTE 3:
For PUSCH to PUSCH transitions with the allocated resource blocks fixed in frequency and no transmission gaps other than those generated by downlink subframes, DwPTS fields or Guard Periods for TDD: for a power step $\Delta P \leq 1$ dB, the relative power tolerance for transmission is ± 1.0 dB.

Aggregate power control tolerance is the ability of a UE to maintain its power in non-contiguous transmission within 21 ms in response to 0 dB TPC commands with respect to the first UE transmission (provided that the power control parameters remain unchanged). The minimum requirement for the aggregate power control tolerance is ±2.5 dB for PUCCH and ±3.5 dB for PUSCH, assuming UE transmission gap of 4 ms and that the transmit power control command is transmitted via PDCCH 4 subframes preceding each PUCCH and PUSCH transmission, respectively.

TS 36.101 also specifies transmit power control tolerance (absolute, relative, and aggregate) with CA, in a similar way as described for non-CA above. The requirements apply for one single PUCCH, PUSCH or SRS transmission of contiguous physical resource block (PRB) allocation per CC for all CCs with all component carriers active. The requirements can be tested by time aligning any transmission gaps on all the component carriers.

LTE may also operate in unlicensed spectrum. Some of these operations are described below.

One mode is referred to as licensed-assisted access (LAA) to unlicensed spectrum using LTE. The unlicensed spectrum (e.g., in 5-6 GHz range such between: 5150 MHz-5925 MHz) can be simultaneously used by multiple different technologies (e.g., between LTE and IEEE Wi-Fi). LAA facilitates LTE equipment to operate in an unlicensed radio spectrum. The same LAA concept can be used in other spectrum (i.e., 3.5 GHz in North America) as well. An example is illustrated in FIG. 3.

FIG. 3 illustrates a UE operating in LAA mode in an LTE network. In LAA mode, devices connect in the licensed spectrum (primary cell or PCell) and use carrier aggregation to benefit from additional transmission capacity in the unlicensed spectrum (secondary cell or SCell). Therefore, a UE can be configured with one or more SCells in the unlicensed spectrum, which are operated with frame structure type 3.

Because the unlicensed spectrum must be shared with other wireless technologies (e.g., Wi-Fi, radar, Bluetooth, fixed satellite system, etc.), a listen-before-talk (LBT) method is used. LBT involves sensing the medium for a pre-defined minimum amount of time to determine whether there is a transmission, and backing off if the channel is busy (i.e., not transmitting if there is a transmission on the channel).

Some LTE systems operate in unlicensed spectrum completely in a standalone manner. The difference between LAA and standalone LTE in unlicensed band is that standalone usage does not include a licensed carrier to be aggregated with unlicensed carrier, while an unlicensed LTE carrier is always aggregated with a licensed carrier in LAA operations. Standalone operation means that uplink is allowed in unlicensed spectrum. Because support from a licensed carrier is not available, the standalone LTE system is responsible for all functionalities in unlicensed spectrum.

LAA may also operate in dual connectivity (DC) mode. The unlicensed carrier can be aggregated with a licensed carrier using dual connectivity. In dual connectivity mode, at least one CC in MeNB is termed as PCell and at least one CC in SeNB is termed as PSCell. PCell and PSCell are functionally similar nodes. However activation, deactivation, configuration, deconfiguration of PSCell is controlled by the PCell. The connected nodes in DC operation are independent to each other, thus, all control signaling is done separately.

LTE also includes license-shared operation. In a licensed shared spectrum, more than one radio access technology (RAT) has permission to access the spectrum. All the RATs have equal status in terms of priority. The allowed systems access the spectrum based on a fairness criterion, e.g. LBT. This is also referred to as horizontal sharing of the spectrum. LTE may be used in such spectrum scenarios.

Particular problems exist with SRS carrier-based switching. Using current uplink power accuracy requirements, the SRS transmission may not obtain the power control accuracy when SRS carrier-based switching is used. This depends on the transmission gap in time between two uplink transmissions in any carrier. If the transmission gap is larger than a certain value, then the UE has to meet absolute tolerance requirement for uplink power control. Otherwise, the UE has to meet relative tolerance requirement for the uplink power control.

For SRS carrier-based switching, this can be a problem, because (1) there may not be any uplink transmission in the carrier within the gap time; and (2) there may be a number of SRS carrier-based switching operations planned which may increase the gap time. In addition, uplink and/or downlink LBT will also increase the gap when uplink and/or downlink LBT is required in at least one carrier where SRS carrier-based switching is performed.

SUMMARY

The embodiments described herein include adapting uplink power control parameters for sounding reference signals (SRS) carrier-based switching. According to some embodiments, a method for use in a user equipment (UE) operable to transmit a SRS on a plurality of carriers comprises: obtaining an indication to perform SRS carrier-based switching for at least one carrier of the plurality of carriers; adapting at least one parameter for uplink transmit power control in response to the obtained indication; and transmitting an uplink signal using the adapted at least one parameter for uplink power control while meeting at least one predetermined uplink power control requirement.

In particular embodiments, adapting the at least one parameter for uplink transmit power control comprises adapting a transmission gap parameter. Meeting at least one predetermined uplink power control requirement comprises meeting at least one absolute power control requirement or meeting at least one relative power control requirement based on the transmission gap parameter. For example, adapting the transmission gap parameter may comprise adapting the transmission gap parameter to 40 ms. Meeting at least one predetermined uplink power control requirement may comprise meeting at least one absolute power control requirement when the transmission gap length is greater than 40 ms and meeting at least one relative power control requirement when the transmission gap length is less than or equal to 40 ms.

In particular embodiments, adapting the transmission gap parameter comprises adapting at least one of an uplink power control step power value, an uplink power control step time value, an absolute transmit power, and a relative transmit power. Meeting at least one predetermined uplink power control requirement may comprise meeting at least one of an absolute transmit power tolerance, an aggregate power control requirement, an uplink power control accuracy requirement, and minimum or maximum transmit power adjustment over a single step or period of time.

In particular embodiments, the method further comprises obtaining an indication that a listen-before-talk (LBT) procedure is used in the uplink or downlink. Adapting the at least one parameter for uplink transmit power control may be based on the indication that the LBT procedure is used in the uplink or downlink. The indication that a LBT procedure is used in the uplink or downlink may apply to a particular carrier of the plurality of carriers. Adapting the at least one parameter for uplink transmit power control may be based on whether the carrier for SRS carrier-based switching is the same carrier as the indicated particular LBT carrier.

According to some embodiments, a method for use in a network node operable to receive a SRS on a plurality of carriers comprises: sending, to a UE, an indication to perform SRS carrier-based switching for at least one carrier of the plurality of carriers; and receiving, from the UE, an uplink signal based on at least one parameter for uplink transmit power control adapted in response to the sent indication, wherein the uplink signal meets at least one uplink power control requirement.

In particular embodiments, the at least one parameter for uplink transmit power control adapted in response to the sent indication comprises a transmission gap parameter. The at least one uplink power control requirement comprises meeting at least one absolute power control requirement or meeting at least one relative power control requirement based on the transmission gap parameter. For example, the at least one parameter for uplink transmit power control adapted in response to the sent indication may comprise a transmission gap parameter adapted to 40 ms. The at least one uplink power control requirement may comprise meeting at least one absolute power control requirement when the transmission gap length is greater than 40 ms and meeting at least one relative power control requirement when the transmission gap length is less than or equal to 40 ms.

In particular embodiments, the at least one parameter for uplink transmit power control adapted in response to the sent indication comprises at least one of an uplink power control step power value, an uplink power control step time value, an absolute transmit power, and a relative transmit power. The at least one uplink power control requirement may comprise meeting at least one of an absolute transmit power tolerance, an aggregate power control requirement, an uplink power control accuracy requirement, and minimum or maximum transmit power adjustment over a single step or period of time.

In particular embodiments, the method further comprises sending, to the UE, the at least one parameter for uplink transmit power control. The at least one parameter for uplink transmit power control may comprise a transmission gap parameter.

In particular embodiments, the adapted at least one parameter for uplink transmit power control is adapted based on whether a LBT procedure is used in the uplink or downlink.

According to some embodiments, a UE operable to transmit a SRS on a plurality of carriers comprises a memory coupled to a processor. The processor is operable to: obtain an indication to perform SRS carrier-based switching for at least one carrier of the plurality of carriers; adapt at least one parameter for uplink transmit power control in response to the obtained indication; and transmit an uplink signal using the adapted at least one parameter for uplink power control while meeting at least one predetermined uplink power control requirement.

According to some embodiments, a network node operable to receive a SRS on a plurality of carriers comprises a memory coupled to a processor. The processor is operable to: send, to a UE, an indication to perform SRS carrier-based switching for at least one carrier of the plurality of carriers; and receive, from the UE, an uplink signal based on at least one parameter for uplink transmit power control adapted in response to the sent indication, wherein the uplink signal meets at least one uplink power control requirement.

According to some embodiments, a UE operable to transmit a SRS on a plurality of carriers comprises an obtaining module, an adapting module, and a transmitting module. The obtaining module is operable to obtain an indication to perform SRS carrier-based switching for at least one carrier of the plurality of carriers. The adapting module is operable to adapt at least one parameter for uplink transmit power control in response to the obtained indication. The transmitting module is operable to transmit an uplink signal using the adapted at least one parameter for uplink power control while meeting at least one predetermined uplink power control requirement.

According to some embodiments, a network node operable to receive a SRS on a plurality of carriers comprises a sending module and a receiving module. The sending module is operable to send, to a UE, an indication to perform SRS carrier-based switching for at least one carrier of the plurality of carriers. The receiving module is operable to receive, from the UE, an uplink signal based on at least one parameter for uplink transmit power control adapted in response to the sent indication, wherein the uplink signal meets at least one uplink power control requirement.

Also disclosed is a computer program product. The computer program product comprises instructions stored on non-transient computer-readable media which, when executed by a processor, perform the acts of obtaining an indication to perform SRS carrier-based switching for at least one carrier of the plurality of carriers; adapting at least one parameter for uplink transmit power control in response to the obtained indication; and transmitting an uplink signal using the adapted at least one parameter for uplink power control while meeting at least one predetermined uplink power control requirement.

Another computer program product comprises instructions stored on non-transient computer-readable media which, when executed by a processor, perform the acts of sending, to a UE, an indication to perform SRS carrier-based switching for at least one carrier of the plurality of carriers; and receiving, from the UE, an uplink signal based on at least one parameter for uplink transmit power control adapted in response to the sent indication, wherein the uplink signal meets at least one uplink power control requirement.

Particular embodiments may exhibit some of the following technical advantages. For example, particular embodiments may enhance uplink power control performance when SRS carrier-based switching is performed. The UE behavior for uplink power control under SRS switching is well defined. This enables the network to configure the UE with uplink signals that the UE can transmit with optimal power. Particular embodiments include flexibility to obtain uplink power control accuracy requirements when SRS carrier-based switching is used for both licensed and unlicensed spectrum. Some embodiments provide adaptation possibilities to SRS transmissions for different carriers when SRS carrier-based switching is used involving licensed spectrum or unlicensed spectrum or both. Other technical advantages will be readily apparent to one skilled in the art from the following figures, description and claims.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

Figure 1:
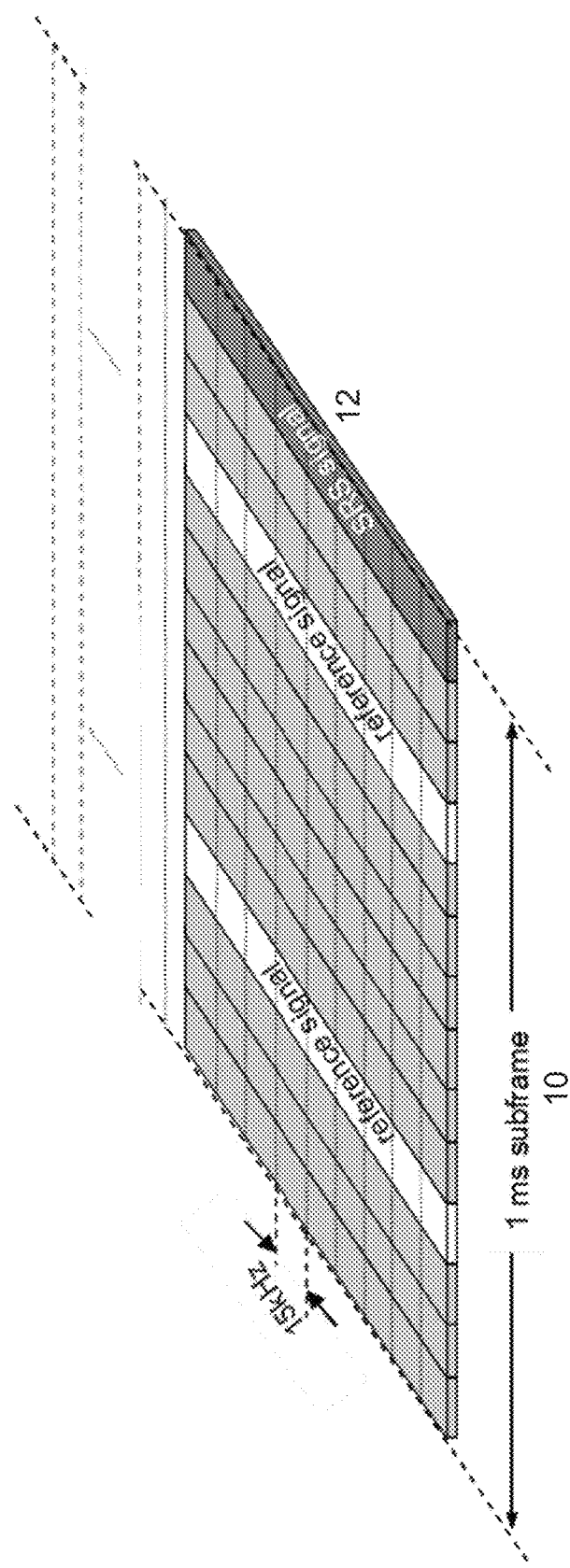
FIG. 1 illustrates an example radio subframe with SRS.

Third Generation Partnership Project (3GPP) long term evolution (LTE) wireless networks may use sounding reference signals (SRS). SRS are known signals that are transmitted by a user equipment (UE) so that an eNodeB can estimate different uplink-channel properties. The estimates may be used for uplink scheduling, link adaptation, and also for downlink multiple antenna transmission, particularly for time division duplex (TDD) networks where the uplink and downlink use the same frequencies.

LTE networks may support carrier aggregation (CA). Many networks may carry traffic that is downlink-heavy, which results in a greater number of aggregated downlink component carriers (CC) than the number of (aggregated) uplink CCs.

For the carrier supporting both uplink and downlink, transmit diversity based feedback without precoding matrix indicator (PMI) and with SRS is beneficial because channel reciprocity can be used. However, a UE generally has the capability of aggregating a larger number of downlink carriers than uplink carriers. As a result, some of the TDD carriers with downlink transmission for the UE will not have an uplink transmission that includes SRS. Channel reciprocity cannot be used for these carriers. Carrier switching between TDD uplink carriers can be a solution to allow SRS transmission on these TDD carriers.

SRS based carrier switching supports SRS switching to and between TDD component carrier(s). SRS based carrier switching is used where the component carriers available for SRS transmission correspond to the component carriers available for carrier aggregation of physical downlink shared channel (PDSCH), while the UE has fewer component carriers available for carrier aggregation of physical uplink shared channel (PUSCH).

3GPP defines absolute and relative power tolerance to control the uplink transmit power quality. TS 36.101 also specifies transmit power control tolerance (absolute, relative, and aggregate) with CA, in a similar way as described for non-CA above.

Particular problems exist with SRS carrier-based switching. Using current uplink power accuracy requirements, the SRS transmission may not obtain the power control accuracy when SRS carrier-based switching is used. This depends on the transmission gap in time between two uplink transmissions in any carrier. If the transmission gap is larger than a certain value, then the UE has to meet absolute tolerance requirement for uplink power control. Otherwise, the UE has to meet relative tolerance requirement for the uplink power control.

For SRS carrier-based switching, this can be a problem, because (1) there may not be any uplink transmission in the carrier within the gap time; and (2) there may be a number of SRS carrier-based switching operations planned which may increase the gap time. In addition, uplink and/or downlink LBT will also increase the gap when uplink and/or downlink LBT is required in at least one carrier where SRS carrier-based switching is performed.

Particular embodiments obviate the problems described above and include a UE capable of performing the following steps. At step 1, the UE adapts at least one parameter related to uplink transmit power control in response to SRS carrier-based switching for at least one carrier. At step 2, the UE configures itself to transmit signals in uplink based on the adapted parameter, while meeting at least one predetermined uplink power control requirement. At step 3, the UE may save the at least one parameter for using it later (e.g., at a next SRS switching hop or at a next SRS switching occasion to the same carrier). At step 4, the UE may transmit signals in uplink based on the adapted parameter and/or perform uplink power control based on the adapted parameter. Particular steps may be omitted in some embodiments.

In some embodiments, a network node performs the following steps. At step 1, the network node determines at least one parameter related to uplink transmit power control to account for SRS carrier-based switching in at least one carrier. At step 2, the network node transmits at least one parameter (e.g., PC command, PC step size configuration, etc.) related to uplink power control to a UE based on at least one determined parameter in step 1. At step 3, the network node saves the at least one determined parameter for using it later for one or more UEs (e.g., at a next SRS switching hop or at a next SRS switching occasion to the same carrier). At step 4 the network node schedules the UE for transmitting uplink signals based on at least one determined parameter in step 1. Particular steps may be omitted in some embodiments.

Particular embodiments may enhance uplink power control performance when SRS carrier-based switching is performed. The UE behavior for uplink power control under SRS switching is well defined. This enables the network to configure the UE with uplink signals that the UE can transmit with optimal power. Particular embodiments include flexibility to obtain uplink power control accuracy requirements when SRS carrier-based switching is used for both licensed and unlicensed spectrum. Some embodiments provide adaptation possibilities to SRS transmissions for different carriers when SRS carrier-based switching is used involving licensed spectrum or unlicensed spectrum or both.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described. These embodiments are presented as teaching examples and are not to be construed as limiting the scope of the disclosed subject matter. For example, certain details of the described embodiments may be modified, omitted, or expanded upon without departing from the scope of the described subject matter.

Even though the examples herein are given in the license assisted access (LAA) context, the embodiments described herein are not limited to LAA. The described embodiments are not limited to LTE either, but can be adapted in other RATs too, e.g., UTRA, LTE-Advanced, 5G, NX, NB-IoT, WiFi, BlueTooth, etc.

Particular embodiments are described with reference to FIGS. 4-9B of the drawings, like numerals being used for like and corresponding parts of the various drawings. LTE is used throughout this disclosure as an example cellular system, but the ideas presented herein may apply to other wireless communication systems as well.

Figure 4:
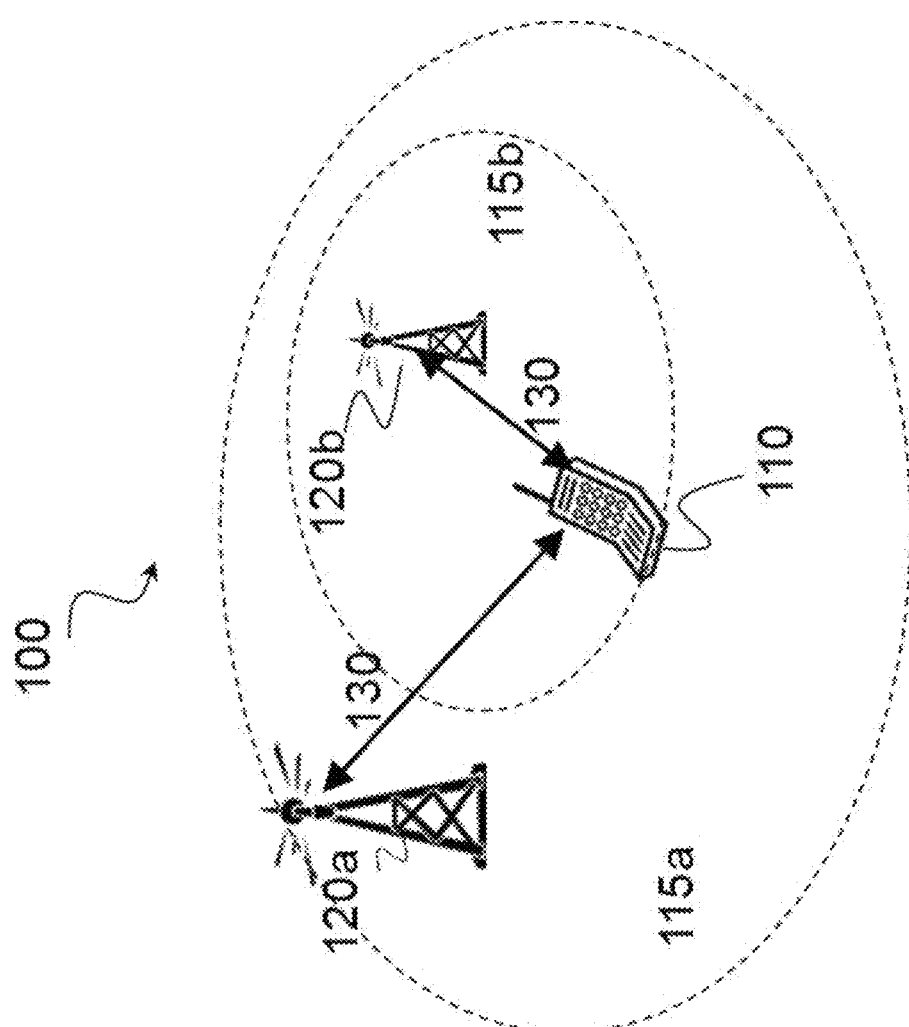
FIG. 4 is a block diagram illustrating an example wireless network, according to some embodiments.

FIG. 4 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Wireless device 110 may also be referred to as a UE. Network node 120 serves coverage area 115 (also referred to as cell 115).

Some embodiments may use a non-limiting term user equipment (UE). The UE may refer to any type of wireless device 110 capable of communicating with a network node 120 or another wireless device 110 over radio signals, such as wireless signals 130. The UE may include a radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE), etc.

In some embodiments, generic terminology such as "radio network node" or simply "network node (NW node)" is used. It may refer to any kind of network node such as a base station, radio base station, base transceiver station, base station controller, network controller, evolved Node B (eNB), Node B, Multi-cell/multicast Coordination Entity (MCE), relay node, access point, radio access point, Remote Radio Unit (RRU) Remote Radio Head (RRH), a core network node (e.g., TCE, MME, MDT node, MBMS node), or even an external node (e.g., 3rd party node, a node external to the current network), etc. The term "radio node" as used herein may refer to a wireless device 110 or a network node 120.

In general, wireless devices 110 that are within coverage of network node 120 (e.g., within cell 115 served by network node 120) communicate with network node 120 by transmitting and receiving wireless signals 130. For example, wireless devices 110 and network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Communication between wireless device 110 and network node 120 may be referred to as cellular communication. Wireless signals 130 may include both downlink transmissions (from network node 120 to wireless devices 110) and uplink transmissions (from wireless devices 110 to network node 120).

Each network node 120 may have a single transmitter or multiple transmitters for transmitting signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120 or other wireless devices 110.

Particular embodiments may include single carrier, multicarrier or carrier aggregation (CA) operation. In carrier aggregation, the wireless device (e.g., wireless device 110) is able to receive and/or transmit data to more than one serving cell (e.g., cells 115a and 115b). Carrier aggregation may also be referred to as "multi-carrier system", "multi-cell operation", "multi-carrier operation", "multi-carrier" transmission and/or reception. In CA one of the component carriers (CCs) is the primary component carrier (PCC) or simply primary carrier or even anchor carrier. The remaining ones are called secondary component carrier (SCC) or simply secondary carriers or even supplementary carriers. The serving cell may also be referred to as primary cell (PCell) or primary serving cell (PSC). Similarly, the secondary serving cell may be referred to as secondary cell (SCell) or secondary serving cell (SSC).

In Dual Connectivity (DC) operation, a UE (e.g., wireless device 110) can be served by at least two network nodes (e.g., network nodes 120) referred to as master eNB (MeNB) and secondary eNB (SeNB). Generally, in multiple connectivity operation the UE can be served by two or more nodes (e.g., MeNB, SeNB1, SeNB2 and so on). The UE is configured with PCC from both MeNB and SeNB. The PCell from MeNB and SeNB are referred to as PCell and PSCell, respectively.

The PCell and PSCell operate the UE typically independently. The UE is also configured with one or more SCCs from each of MeNB and SeNB. The corresponding secondary serving cells served by MeNB and SeNB are referred to as SCell. The UE in DC typically has separate TX/RX for each of the connections with MeNB and SeNB. This enables the MeNB and SeNB to independently configure the UE with one or more procedures (e.g., radio link monitoring (RLM), DRX cycle, etc.) on their PCell and PSCell respectively. The methods and embodiments described herein are applicable to both CA, DC and Multi-Connectivity (MC).

The term "signaling" used herein may comprise any of: high-layer signaling (e.g., via RRC), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term DRS or discover (or discovery) signal may comprise of any type of reference signal, which can be used by the UE for performing one or more measurements. Examples of DRS are CRS, CSI-RS, PSS, SSS, MBSFN RS, etc. One or more DRS may be transmitted in the same DRS time resource. Examples of DRS time resource are symbol, subframe, slot, etc.

The term "measurement" herein refers to radio measurements. Some examples of the radio measurements are: RSSI measurement, channel occupancy measurement, WiFi RSSI measurement, signal strength or signal power measurements (e.g., RSRP or CSI-RSRP), signal quality measurements (e.g., RSRQ, SINR), timing measurements (e.g., Rx-Tx, RSTD, RTT, TOA), radio link monitoring measurements (RLM), CSI, PMI, cell detection, cell identification, number of successful reports, number of ACKs/NACKs, failure rate, error rate, etc. The measurements may be absolute or relative (e.g., absolute RSRP and relative RSRP). The measurements may be performed for one or more different purpose, e.g., RRM, SON, positioning, MDT, etc. The measurements may be, e.g., intra-frequency measurements, inter-frequency measurements, or CA measurements. The measurements may be performed in the licensed and/or unlicensed spectrum.

The term LBT used herein may correspond to any type of CSMA procedure or mechanism which is performed by the node on a carrier before deciding to transmit signals on that carrier. CSMA or LBT may also interchangeably be referred to as clear channel assessment, clear channel determination, etc.

Figure 2:
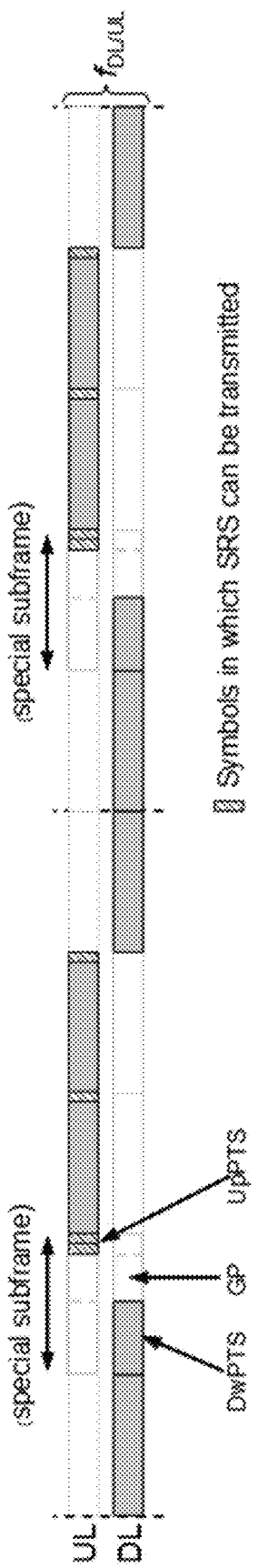
FIG. 2 illustrates an example subframe format for TDD.
Figure 3:
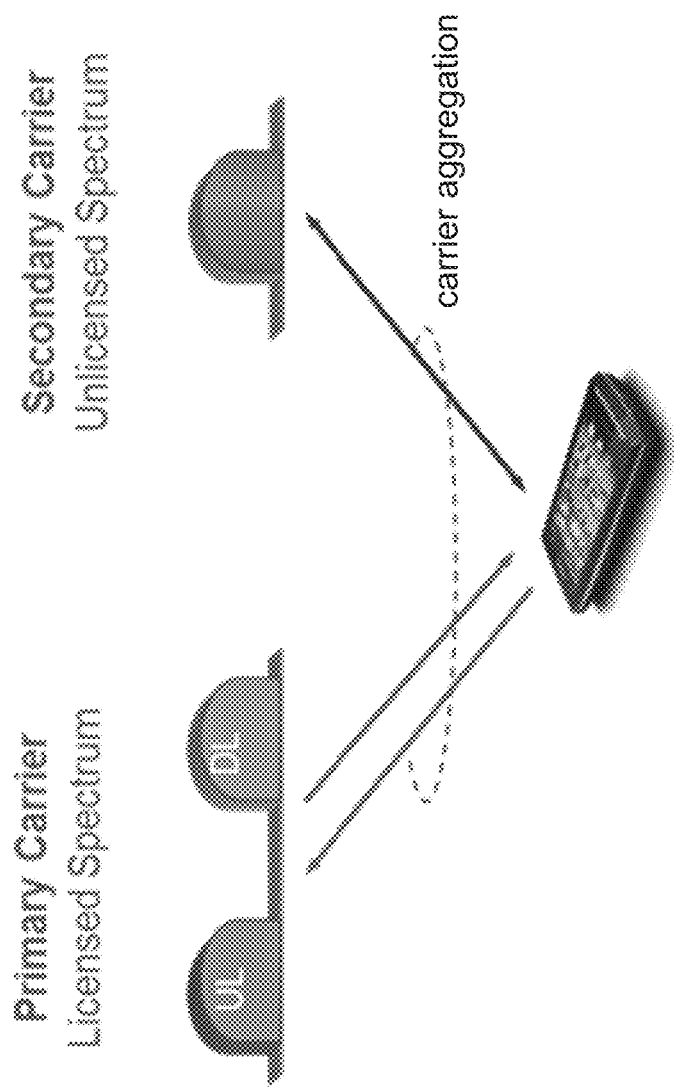
FIG. 3 illustrates a UE operating in LAA mode in an LTE network.

Wireless signals 130 may include SRS, such as those described with respect to FIGS. 1 and 2. Wireless device 110 may perform power control in the uplink. Wireless device 110 is operable to transmit a SRS on a plurality of carriers. Wireless device 110 may obtain an indication to perform SRS carrier-based switching for at least one carrier of the plurality of carriers. Wireless device 110 may adapt at least one parameter for uplink transmit power control in response to the obtained indication. Wireless device 110 may transmit an uplink signal using the adapted at least one parameter for uplink power control while meeting at least one predetermined uplink power control requirement.

In particular embodiments, adapting the at least one parameter for uplink transmit power control comprises adapting a transmission gap parameter. Meeting at least one predetermined uplink power control requirement comprises meeting at least one absolute power control requirement or meeting at least one relative power control requirement based on the transmission gap parameter. For example, wireless device 110 may adapt the transmission gap parameter to 40 ms. Wireless device 110 may meet at least one uplink power control requirement by meeting at least one absolute power control requirement when the transmission gap length is greater than 40 ms and meeting at least one relative power control requirement when the transmission gap length is less than or equal to 40 ms.

In particular embodiments, wireless device 110 may obtain an indication that a listen-before-talk (LBT) procedure is used in the uplink or downlink. Wireless device 110 may adapt at least one parameter for uplink transmit power control based on the indication that the LBT procedure is used in the uplink or downlink. The indication that a LBT procedure is used in the uplink or downlink may apply to a particular carrier of the plurality of carriers. Adapting the at least one parameter for uplink transmit power control may be based on whether the carrier for SRS carrier-based switching is the same carrier as the indicated particular LBT carrier.

Network node 120 is operable to receive a SRS on a plurality of carriers. Network node 120 may send, to wireless device 110, an indication to perform SRS carrier-based switching for at least one carrier of the plurality of carriers. Network node 120 may receive, from wireless device 110, an uplink signal based on at least one parameter for uplink transmit power control adapted in response to the sent indication, wherein the uplink signal meets at least one uplink power control requirement.

In wireless network 100, each network node 120 may use any suitable radio access technology, such as long term evolution (LTE), LTE-Advanced, UMTS, HSPA, GSM, cdma2000, NR, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 8A below. Similarly, a network node may include any suitable combination of hardware and/or software. For example, in particular embodiments, a network node, such as network node 120, may include the components described with respect to FIG. 9A below.

In general, a UE (such as wireless device 110) is served by a first network node (such as network node 120a) with a PCell operating on a first carrier frequency (f1), and the UE is also capable of being served by at least one secondary serving cell (SCell) (such as network node 120b) also known as a first SCell.

The UE may further be capable of being served by two or more SCells: the first SCell and a second SCell and as follows. The first SCell operates on a second carrier frequency (f2) and the second SCell operates on a third carrier frequency (f3). The same applies for more than two SCells. As an example, the carrier f1 and f3 belong to a licensed spectrum or band, whereas f2 belongs to an unlicensed spectrum or frequency band. Other combinations are also possible.

In an unlicensed spectrum or band, contention based transmission is allowed (i.e., two or more devices (UE or network nodes) can access even the same part of spectrum based on certain fairness constraints, e.g. LBT). In this case no operator (or user or transmitter) owns the spectrum. In a licensed spectrum or licensed band, only contention free transmission is allowed (i.e., only devices (UE or network nodes) allowed by the owner of the spectrum license can access the licensed spectrum).

In some embodiments, the UE may also be capable of being served by more than two SCells (e.g., a third SCell operating on carrier frequency (f4) and so on). Frequency f4 can be either in a licensed spectrum (or band), or in unlicensed spectrum (or band). The carrier f1 is interchangeably referred to as PCC, while carriers f2, f3, and f4 may interchangeably be referred to as SCC1, SCC2, and SCC3, respectively. An example is illustrated in FIG. 5.

Figure 5:
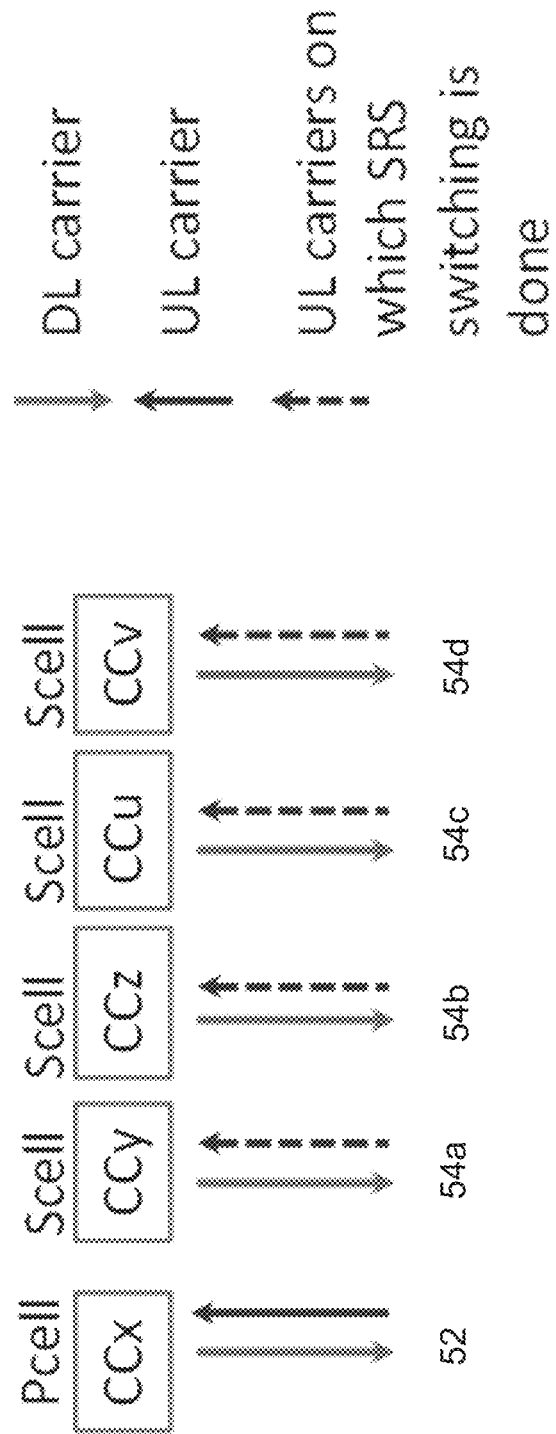
FIG. 5 illustrates an example configuration of carrier aggregation with SRS carrier-based switching, according to some embodiments.

FIG. 5 illustrates an example carrier aggregation configuration, according to some embodiments. The illustrated example includes a typical arrangement with five downlink component carriers and two uplink component carriers. The Pcell uses component carrier 52. The Scells use component carriers 54a, 54b, 54c, and 54d.

One uplink is fixed in the Pcell component carrier 52. SRS switching is performed on one of the SCells component carriers 54. At any point of time, the configuration is a two uplink CA combination. The same example scenario an also be shown with other numbers of aggregated CCs in downlink and uplink. The carriers, i.e. CCy, CCz, CCu and CCv, can be in different band also. For example, CCy can be in any band below 1 GHz, CCz can be in any band around 2 GHz, and CCu can be any band in 3.5 GHz.

The terms "served" or "being served" herein means that the UE is configured with the corresponding serving cell and can receive from and/or transmit data to the network node on the serving cell (e.g., on PCell or any of the SCells). The data is transmitted or received via physical channels (e.g., PDSCH in downlink, PUSCH in uplink, etc.).

A network node may request a UE to switch SRS transmission to one or more SCells as follows: (a) receiving a first SCell SRS switching request message or command from a second network node for switching SRS carrier from the first SCell; (b) receiving a second SCell SRS switching request message or command from a third network node for switching SRS carrier from the second SCell; and (c) receiving a third SCell SRS switching request message or command from a fourth network node for switching SRS carrier from the third SCell.

Particular embodiments are described for at least one SCell on unlicensed spectrum or in some cases for two SCells with one on licensed and one on unlicensed spectrum or frequency bands. However, the embodiments are applicable to any number of SCells where at least one SCell operates on a component carrier belonging to an unlicensed spectrum or frequency band.

In some embodiments, at least some of the first, second, third, and fourth network nodes are the same or are co-located at the same site or location. For example, in such embodiments the UE may receive one or more messages or command for switching SRS carrier(s) from one or more SCells from the first network node. Also for example, in such embodiments the UE may receive one or more messages for SRS switching of one or more SCells from the PCell.

In some embodiments, any combination of the first, second, third and fourth network nodes are different and may be located at different sites or location or may be logically different nodes that may still be co-located. In such embodiments, the UE may receive one or more messages for SRS carrier switching from one or more SCells from the respective SCells.

In some embodiments, one or more SRS switching messages or commands may be received by the UE via RRC signaling. In some embodiments, one or more SRS switching messages or command may be received by the UE via MAC CE command.

Particular embodiments include methods in a UE of adapting uplink transmissions when SRS carrier-based switching is used. In some embodiments, a UE is capable of performing the following steps. At step 1, the UE adapts at least one parameter related to uplink transmit power control in response to SRS carrier-based switching for at least one carrier. At step 2, the UE configures itself to transmit signals in uplink based on the adapted parameter, while meeting at least one predetermined uplink power control requirement. At step 3, the UE may save the at least one parameter for using it later (e.g., at a next SRS switching hop or at a next SRS switching occasion to the same carrier). At step 4, the UE may transmit signals in uplink based on the adapted parameter and/or perform uplink power control based on the adapted parameter. Particular steps may be omitted in some embodiments.

In particular embodiments, the power control (PC) may comprise the controlling of the total transmit power, average transmit power of one or more carriers, total transmit power for one or more carriers, transmit power per carrier, transmit power for one or more uplink transmissions (e.g., SRS transmission involved in SRS switching, another SRS transmission, PUCCH, PUSCH, etc.).

Example parameters include: transmission gap length, uplink power control step (the amount of uplink power adjustment), uplink power control step in time (the time between two uplink power settings in the UE), an uplink power control parameter in general, absolute transmit power, relative transmit power, and a reference for determining SRS transmission power.

Example uplink power control requirements include: absolute transmit power tolerance for non-CA case or for CA case; relative transmit power tolerance for non-CA case or for CA case; aggregate power control requirement for non-CA case or for CA case; uplink power control accuracy, any requirement related to output power dynamics, transmission mask, minimum output power, transmit power setting accuracy in the UE, minimum or maximum transmit power adjustment in one step, minimum or maximum transmit power adjustment over a number of steps or over a certain time, etc.

At step 1, the UE may adapt at least one parameter related to uplink transmit power control in response to SRS carrier-based switching for at least one carrier. The at least one parameter may comprise transmission gap length. The transmission gap length herein refers to a time period during which the UE does not transmit any signal or the time between two closest UE transmissions. The UE may also turn off its transmitter partly or fully. For example, in case of partial cessation of its transmitter, the UE may turn off its RF front end but it may still operate its baseband processing unit. The inactivity may be due to lack of uplink traffic/data, inability to send uplink signals (e.g., due to lack of uplink grant/resources etc.), transmission avoidance to reduce or avoid uplink interference or emissions, etc.

The at least one parameter may be a power control parameter such as uplink power control step (the adjustment amount and/or the adjustment time periods).

The adaptation may be performed autonomously by the UE or may be based on assistance received from a network node (e.g., eNodeB). The adaptation may also be performed by the UE based on pre-defined rule.

The adaptation may be performed for one or more carrier frequencies. In a further example, the adaptation may be performed for one or more carrier frequencies with radio operation under a specific frame structure type (e.g., FS3).

In another embodiment, the adaptation may comprise determining the parameter as a function of SRS carrier-based switching configuration for at least one carrier. The parameter may depend on one or more of the following SRS carrier-based switching configuration (R) aspects: (a) that SRS carrier-based switching can happen for at least one carrier (e.g., the parameter may be pre-defined and fixed but may be different depending on whether SRS carrier-based switching is performed or not); (b) the number of uplink carriers on which SRS carrier-based switching happens (e.g., the total number or the number of configured uplink SRS transmissions); (c) the time period (T1) during which the number of SRS transmissions has occurred; (d) the length of a single SRS switching; (e) SRS switching rate; (f) the length of a single SRS switching loop (e.g., involving all carriers no more than one time); (g) the maximum or a minimum length of SRS switching; (h) subframe type for SRS transmission (e.g., TDD special subframe or a normal uplink subframe); (i) the length of the SRS transmission occasion (e.g., 1 symbol or 3 symbols); (j) the reference for determining the SRS transmission power (e.g., PUSCH of the same carrier or another reference signal/channel or a parameter); and (k) a characteristic (e.g., uplink or downlink direction, signal type, transmission power, etc.) for the transmission preceding the switched SRS transmission on the same carrier.

In a particular example, the UE adapts the transmission gap parameter associated with uplink power control based on the comparison of the SRS switching period (T1) with a threshold (H1). For example: if T1>H1, then the UE applies or assumes a first value (V1) of the transmission gap parameter associated with uplink power control; and if T1≤H1, then the UE applies a second value (V2) of the transmission gap parameter associated with uplink power control.

An example of H1 is 20 ms. Examples of V1 and V2 are absolute accuracy and relative accuracy values of uplink power control step size, respectively.

In yet another aspect of this embodiment, the transmission gap parameter associated with uplink power control to account for SRS carrier-based switching is determined by a function (TG). TG is typically expressed in time units or time resources (e.g., symbols, time slots, subframes, frames, X ms, Y seconds, etc.).

If the transmission gap is larger than TG, then the UE has to meet absolute tolerance requirement for uplink power control, otherwise, the UE has to meet relative tolerance requirement for the uplink power control. The absolute tolerance or accuracy of the uplink power control step size is less stringent than the relative tolerance or accuracy of the uplink power control step size. This rule requires the UE to regularly monitor and determine the expected gap length after the occurrence of SRS transmission. Based on the determined gap length, the UE adjusts its transmitter circuitry to meet the corresponding uplink power control requirements.

An example of the function (TG) may be expressed by a general function as follows:

$$TG = f(T0, \Delta s) \quad (1)$$

where T0 is a fixed minimum value or basic gap length (e.g., T0=20 ms). The symbol $\Delta s$ is a duration of variable gap length in negative value that may be decided by the UE autonomously, which corresponds to the effect of SRS carrier-based switching for at least one of the carriers. $\Delta s$ can be one or more parameters defining SRS carrier-based switching configuration. Examples of $\Delta s$ are SRS switching rate, SRS switching period (T1), etc. as listed in the previous description. Maximum $\Delta s$ may also be pre-defined and/or configured at the UE by the network node.

Another example of the function (TG) may be expressed by another general expression as follows:

$$TG = T0 - \Delta s \quad (2)$$

A specific example of the function TG is as follows:

$$TG = 20 \text{ ms} - \Delta s \quad (3)$$

Another example of the function (TG) may be expressed by another general expression as follows:

$$TG = \text{MAX}\{T1, (T0 - \Delta s)\} \quad (3\text{-}1)$$

A related specific example of the function TG is as follows:

$$TG = \text{MAX}\{20 \text{ ms}, (T0 - \Delta s)\} \quad (3\text{-}2)$$

Assuming T1=25 ms, then based on (3-1) and (3-2), TG=25 ms.

The value of $\Delta s$ can be defined in one of the following ways. For example $\Delta s$ may be defined as number of time resources (e.g., subframes). As an example, $\Delta s < T0$ and a non-zero number.

Δs can be carrier specific, which can be defined based on SRS configurations, SRS periodicity, etc. for which SRS switching is being performed. As an example Δs(f1)=5 ms and Δs(f2)=3 ms.

In one example, Δs is non-negative positive value (e.g., the transmission gap length is reduced by Δs if at least one SRS carrier-based switching occurs in any carrier). Thus, (TG) may be expressed by another general expression as follows:

$$TG = T0 + \Delta s \quad (4)$$

A specific example of the function TG is as follows:

$$TG = 20 \text{ ms} + \Delta s \quad (5)$$

Another example of the function (TG) may be expressed by another general expression as follows:

$$TG = \text{MAX}\{T1, (T0 + \Delta s)\} \quad (5\text{-}1)$$

A related specific example of the function TG is as follows:

$$TG = \text{MAX}\{20 \text{ ms}, (T0 + \Delta s)\} \quad (5\text{-}2)$$

A rule may be specified that due to large number of SRS carrier switching requirements, the transmission gap length associated with uplink power control for one or more of the involved carriers to meet absolute power tolerance may be extended or reduced by certain margin(s). For example one or more of the following may be specified that: (a) the absolute power tolerance is the ability of the UE transmitter to set its initial output power to a specific value for the first sub-frame at the start of a contiguous transmission or non-contiguous transmission with a transmission gap smaller than (20−Δs) ms; (b) the absolute power tolerance is the ability of the UE transmitter to set its initial output power to a specific value for the first sub-frame at the start of a contiguous transmission or non-contiguous transmission with a transmission gap smaller than MAX{20 ms, (T0−Δs)} ms; (c) the absolute power tolerance is the ability of the UE transmitter to set its initial output power to a specific value for the first sub-frame at the start of a contiguous transmission or non-contiguous transmission with a transmission gap larger than (20+Δs) ms; (d) the absolute power tolerance is the ability of the UE transmitter to set its initial output power to a specific value for the first sub-frame at the start of a contiguous transmission or non-contiguous transmission with a transmission gap larger than MAX{20 ms, (T0+Δs)} ms; (e) the absolute power tolerance is the ability of the UE transmitter to set its initial output power to a specific value for the first sub-frame at the start of a contiguous transmission or non-contiguous transmission with a transmission gap larger than 20+Δs+δ ms, where δ is in e.g. number of time resources (e.g., subframes) representing implementation margin; (f) the absolute power tolerance is the ability of the UE transmitter to set its initial output power to a specific value for the first sub-frame at the start of a contiguous transmission or non-contiguous transmission with a transmission gap larger than MAX{20 ms, (20+Δs+δ)} ms, where δ is in e.g. number of time resources (e.g., subframes) representing implementation margin; and (g) the absolute power tolerance is the ability of the UE transmitter to set its initial output power to a specific value for the first sub-frame at the start of a contiguous transmission or non-contiguous transmission with a transmission gap smaller than MAX{20 ms, (20−Δs+δ)} ms, where δ is in e.g. number of time resources (e.g., subframes) representing implementation margin.

At step 2, the UE is configured to switch SRS transmission in uplink in at least one of the carriers based on the adapted parameter, while meeting at least one predetermined uplink power control requirement.

Particular embodiments include methods in a network node of adapting uplink transmissions when SRS carrier-based switching is used. For example, methods in a network node may include the following steps. At step 1, the network node determines at least one parameter related to uplink transmit power control to account for SRS carrier-based switching in at least one carrier. At step 2, the network node transmits at least one parameter (e.g., PC command, PC step size configuration, etc.) related to uplink power control to a UE based on at least one determined parameter from step 1. At step 3, the network node may save the at least one determined parameter for using it later for one or more UEs (e.g., at a next SRS switching hop or at a next SRS switching occasion to the same carrier). At step 4, the network node may schedule the UE for transmitting uplink signals based on at least one determined parameter from step 1. Particular embodiments may omit some steps.

The power control (PC) may be the total transmit power, transmit power for one or more carriers, transmit power for one or more uplink transmissions (e.g., SRS transmission involved in SRS switching, another SRS transmission, PUCCH, PUSCH, etc.).

Example parameters include: transmission gap length, uplink power control step (the amount of uplink power adjustment), uplink power control step in time (the time between two uplink power settings in the UE), an uplink power control parameter in general, absolute transmit power, relative transmit power, and a reference for determining SRS transmission power.

Example uplink power control requirements include: absolute transmit power tolerance for non-CA case or for CA case; relative transmit power tolerance for non-CA case or for CA case; aggregate power control requirement for non-CA case or for CA case; uplink power control accuracy, any requirement related to output power dynamics, transmission mask, minimum output power, transmit power setting accuracy in the uplink, minimum or maximum transmit power adjustment in one step, minimum or maximum transmit power adjustment over a number of steps or over a certain time, etc.

At step 1, the network node adapts at least one parameter related to uplink transmit power control to account for SRS carrier-based switching in at least one carrier. In one example, the at least one parameter may be a transmission gap length. The transmission gap length herein refers to a time period during which the UE does not transmit any signal or the time between two closest UE transmissions. The UE may also turn off its transmitter partly or fully. For example, in case of partial cessation of its transmitter the UE may turn off its RF front end but it may still operate its baseband processing unit. The inactivity may be due to lack of uplink traffic/data, inability to send uplink signals (e.g., due to lack of uplink grant/resources, etc.), transmission avoidance to reduce or avoid uplink interference or emissions, etc.

The at least one parameter may be a power control parameter such as an uplink power control step (the adjustment amount and/or the adjustment time periods). For example, the step in time may be extended and/or the amount of uplink transmit power adjustment may be increased depending on the number of carriers for which SRS carrier-based switching is performed at the UE.

The adaptation methods may be similar to those described above for the method in a UE. The adapted parameter may further be stored in the network node. Prior to performing the adaptation for a UE, the network node may also determine whether the SRS carrier-based switching for at least one carrier can be performed by the UE (e.g., based on the UE capability).

At step 2, the network node may perform uplink power control for at least one UE based on the adapted parameter. For example, the network node may signal to the UE the adapted parameter or one or more of its components (e.g., Δs) or an uplink power control configuration based on the adapted parameter.

The power control may be performed via unicast, multicast, or broadcast signaling.

Particular embodiments include a method in a UE of adapting uplink transmissions based on the type of spectrum when SRS carrier-based switching is used. For example, a method in a UE may include the following steps. At step 1, the UE adapts at least one parameter related to uplink transmit power control in response to SRS carrier-based switching for at least one carrier and at least one of the carriers requires uplink and/or downlink LBT. At step 2, the UE configures itself to transmit in uplink based on the adapted parameter, while meeting at least one predetermined uplink power control requirement. At step 3, the UE saves the at least one parameter for using it later (e.g., at a next SRS switching hop or at a next SRS switching occasion to the same carrier). Examples of power control, power control parameters, and power control requirements are the same as those described above for the other embodiments.

At step 1, the at least one parameter may comprise transmission gap length. The transmission gap may include a gap occurring due to LBT failure or due to a combination of LBT failure and inactivity.

The at least one parameter may comprise a power control parameter such as uplink power control step (the adjustment amount and/or the adjustment time periods). For example, the step in time may be extended and/or the amount of uplink transmit power adjustment may be increased depending on the uplink LBT result or LBT success probability or may be a function of LBT (e.g., the maximum number of LBT attempts or the number of attempts until the channel access is successful).

In one embodiment, the adaptation may comprise selectively using the parameter configuration, depending on uplink LBT and/or uplink LBT (e.g., a first parameter configuration is used in the case with no uplink LBT or downlink LBT, while a second parameter configuration is used in the case with uplink LBT and/or downlink LBT). The second parameter configuration may be pre-defined, pre-configured, received from another node, obtained based on a pre-defined rule, read from the memory, or calculated.

In another embodiment, the adaptation may comprise determining the parameter as a function of uplink LBT and/or downlink LBT when SRS carrier-based switching is performed involving at least one carrier which requires LBT (e.g., the parameter may depend on one or more of: (a) any of the parameters and factors listed in the embodiments described above; (b) that uplink LBT can take place for at least one carrier for which SRS carrier-based switching will be performed (e.g., the parameter may be pre-defined and fixed but may be different depending on whether uplink LBT is used or not); (c) that downlink LBT can take place for at least one carrier for which SRS carrier-based switching will be performed (e.g., the parameter may be pre-defined and fixed but may be different depending on whether downlink LBT is used); (d) the number of uplink LBTs for at least one carrier for which SRS carrier-based switching will be performed (e.g., the total number or the number of successful or the number of failed LBTs); (e) the number of downlink LBTs for at least one carrier for which SRS carrier-based switching will be performed (e.g., the total number or the number of successful or the number of failed LBTs); (f) the time period during which the number of uplink LBTs has occurred for at least one carrier for which SRS carrier-based switching will be performed; (g) the time period during which the number of downlink LBTs has occurred for at least one carrier for which SRS carrier-based switching will be performed; (h) the length of a single uplink LBT for at least one carrier for which SRS carrier-based switching will be performed; (i) the length of a single downlink LBT for at least one carrier for which SRS carrier-based switching will be performed; (i) the maximum or a minimum length of uplink LBTs for at least one carrier for which SRS carrier-based switching will be performed; and (j) the maximum or a minimum length of downlink LBTs for at least one carrier for which SRS carrier-based switching will be performed.

The transmission gap parameter associated with uplink power control to account for uplink LBT and/or downlink LBT when SRS carrier-based switching is performed involving at least carrier which requires LBT may be determined by a function (TG). An example of the function (TG) may be expressed by a general function as follows:

$$TG = f(T0, \Delta s, \Delta 1, \Delta 2) \quad (6)$$

where T0 is a fixed minimum value or basic gap length (e.g., T0=20 ms). The symbol Δs is a duration of variable gap length in negative value that may be decided by the UE autonomously, which corresponds to the effect of SRS carrier-based switching for at least one of the carriers. Δs can be one or more parameters defining SRS carrier-based switching configuration. Examples of Δs are SRS switching rate, SRS switching period (T1), etc. as listed in the previous embodiments. Maximum Δs may also be pre-defined and/or configured at the UE by the network node. Δ1 and Δ2 are duration of variable gap lengths and may depend on uplink LBT and downlink LBT, respectively. Maximum values of Δ1 and Δ2 may be pre-defined and/or configured at the UE by the network node.

For example, Δ1 may be defined as number of time resources (e.g., subframes) during which a UE does not transmit any signal in a cell (e.g., serving cell) due to LBT failure in uplink on that cell. As an example, Δ1=8 ms. Δ2 may be defined as a number of time resources (e.g., subframes) during which the UE does not receive any signal in a cell (e.g., serving cell) from another node (e.g., serving network node) due to LBT failure in downlink on that cell. As an example, Δ2=8 ms.

As another example, a maximum limit on the aggregated value of Δ1 and Δ2 can be pre-defined or configured by the network node. For example, (Δ1+Δ2)≤Δmax, where Δmax=20 ms.

Another example of the function (TG) may be expressed by another general expression is as follows:

$$TG = T0 - \Delta s + \Delta 1 + \Delta 2 \quad (7)$$

A specific example of the function TG is as follows:

$$TG = 20 \text{ ms} - \Delta s + \Delta 1 + \Delta 2 \quad (8)$$

The value of Δs can be defined in one of the following ways. For example, Δs may be defined as number of time resources (e.g., subframes). As a particular example, Δs<T0 and a non-zero number.

Δs can be carrier specific, which can be defined based SRS configurations, SRS periodicity, etc. for which SRS switching is being performed. As a particular example Δs(f1)=5 ms and Δs(f2)=3 ms.

Another example of the function (TG) may be expressed by another general expression as follows:

$$TG=MAX\{T1,(T0-\Delta s+\Delta 1+\Delta 2)\} \quad (8\text{-}1)$$

where the time period T1 is the duration in which the number of SRS transmissions have occurred.

Another example of the function (TG) may be expressed by another general expression as follows:

$$TG=MAX\{T1,(T0+\Delta s+\Delta 1+\Delta 2)\} \quad (8\text{-}1)$$

In one example, Δ1 and Δ2 are non-negative positive values (e.g., the transmission gap length is extended with Δ1 if at least one uplink LBT occurs or if uplink LBT fails at least once. In another example, Δ1 and/or Δ2 may be negative (e.g., if downlink LBT is detected by the UE, the transmission gap may be shortened). Parameters Δ1 and/or Δ2 may be determined by the UE or may be received from a network node.

Another specific example of the function TG, assuming there is no LBT in downlink or LBT in downlink is successful during certain number of subframes, is as follows:

$$TG=20 \text{ ms}-\Delta s+\Delta 1 \quad (9)$$

Another specific example of the function TG, assuming there is no LBT in uplink or LBT in uplink is successful during certain number of subframes, is as follows:

$$TG=20 \text{ ms}-\Delta s+\Delta 2 \quad (10)$$

In one example, Δs is non-negative positive value (e.g., the transmission gap length is reduced by Δs if at least one SRS carrier-based switching occurs in any carrier). Thus, (TG) may be expressed by another general expression as follows:

$$TG=T0+\Delta s+\Delta 1+\Delta 2 \quad (11)$$

A specific example of the function TG is as follows:

$$TG=20 \text{ ms}+\Delta s+\Delta 1+\Delta 2 \quad (12)$$

Another specific example of the function TG, assuming there is no LBT in downlink or LBT in downlink is successful during certain number of subframes, is as follows:

$$TG=20 \text{ ms}+\Delta s+\Delta 1 \quad (13)$$

Another specific example of the function TG, assuming there is no LBT in uplink or LBT in uplink is successful during certain number of subframes, is as follows:

$$TG=20 \text{ ms}+\Delta s+\Delta 2 \quad (14)$$

A rule may be specified that due to large number of SRS carrier switching requirements in addition to due to LBT failure in uplink and/or downlink, the transmission gap length associated with uplink power control to meet absolute power tolerance may be extended by certain margins. For example one or more of the following may be specified that: (a) the absolute power tolerance is the ability of the UE transmitter to set its initial output power to a specific value for the first sub-frame at the start of a contiguous transmission or non-contiguous transmission with a transmission gap larger than 20+Δs+Δ1+Δ2 ms; (b) the absolute power tolerance is the ability of the UE transmitter to set its initial output power to a specific value for the first sub-frame at the start of a contiguous transmission or non-contiguous transmission with a transmission gap larger than 20+Δs+Δ1+δ ms, where δ is in, for example, a number of time resources (e.g., subframes) representing implementation margin; (c) the absolute power tolerance is the ability of the UE transmitter to set its initial output power to a specific value for the first sub-frame at the start of a contiguous transmission or non-contiguous transmission with a transmission gap larger than 20+Δs+Δ2+δ ms, where δ is in, for example, number of time resources (e.g., subframes) representing implementation margin.

At step 2, the UE is configured to switch SRS transmission in uplink in at least one of the carriers based on the adapted parameter, while meeting at least one predetermined uplink power control requirement. Example uplink power requirements are described above.

Particular embodiments include methods in a network node of adapting uplink transmissions based on type of spectrum when SRS carrier-based switching is used. For example, a method in a network node may comprise the following steps. At step 1, the network node adapts at least one parameter related to uplink transmit power control to account for at least one of uplink LBT of a UE and downlink LBT when SRS carrier-based switching is performed for at least one carrier. At step 2, the network node performs uplink power control for a UE based on the adapted parameter. At step 3, the network node saves the at least one parameter for using it later for one or more UEs (e.g., at a next SRS switching hop or at a next SRS switching occasion to the same carrier). Particular embodiments may omit some steps.

The power control (PC) may be the total transmit power, transmit power for one or more carriers, transmit power for one or more uplink transmissions (e.g., SRS transmission involved in SRS switching, another SRS transmission, PUCCH, PUSCH, etc.).

Example parameters include: transmission gap length, uplink power control step (the amount of uplink power adjustment), uplink power control step in time (the time between two uplink power settings in the UE), an uplink power control parameter in general, absolute transmit power, relative transmit power, and a reference for determining SRS transmission power.

Example uplink power control requirements include: absolute transmit power tolerance for non-CA case or for CA case; relative transmit power tolerance for non-CA case or for CA case; aggregate power control requirement for non-CA case or for CA case; UL power control accuracy, any requirement related to output power dynamics, transmission mask, minimum output power, transmit power setting accuracy in the UE, minimum or maximum transmit power adjustment in one step, minimum or maximum transmit power adjustment over a number of steps or over a certain time, etc.

At step 1, the network node adapts at least one parameter related to uplink transmit power control, to account for at least one of uplink LBT of a UE and downlink LBT when SRS carrier-based switching is used for at least one carrier which requires LBT.

In one example, the at least one parameter may be a transmission gap length. The transmission gap may include a gap occurring due to LBT failure or due to combination of LBT failure and inactivity when SRS carrier-based switching is used involving at least one carrier which requires LBT.

The at least one parameter may be a power control parameter such as an uplink power control step (the adjustment amount and/or the adjustment time periods). For example, the step in time may be extended and/or the amount of uplink transmit power adjustment may be increased depending on the uplink LBT result or a success probability or may be a function of LBT when SRS carrier-based switching is used involving at least one carrier which requires LBT (e.g., the maximum number of LBT attempts or the number of attempts until the channel access is successful).

The adaptation methods are similar to those described in the embodiments above. In some embodiments, the adapted parameter may further be stored in the network node. Prior to performing the adaptation for a UE, the network node may also determine whether the uplink LBT can be performed by the UE (e.g., based on the UE capability).

At step 2, the network node may perform uplink power control for a UE based on the adapted parameter. For example, the network node may signal to the UE the adapted parameter or one or more of its components (e.g., Δs and/or Δ1 and/or Δ2) or an uplink power control configuration based on the adapted parameter.

The power control may be performed via unicast, multicast, or broadcast signaling.

Figure 6:
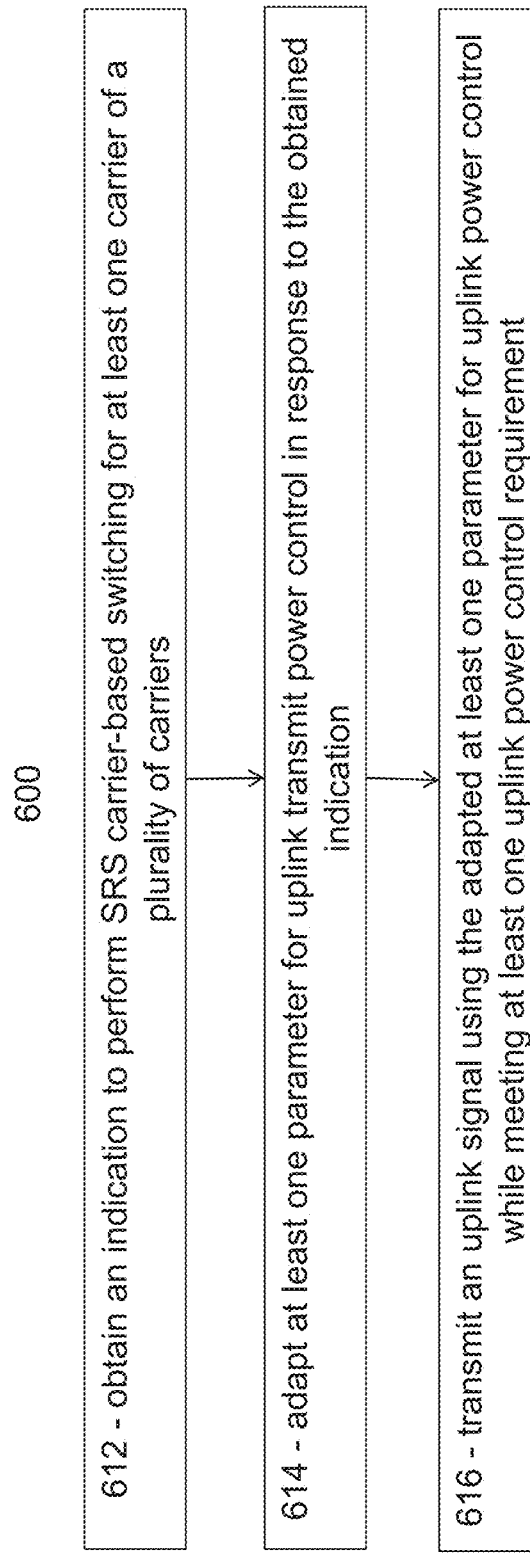
FIG. 6 is a flow diagram illustrating an example method in a UE, according to particular embodiments.
Figure 7:
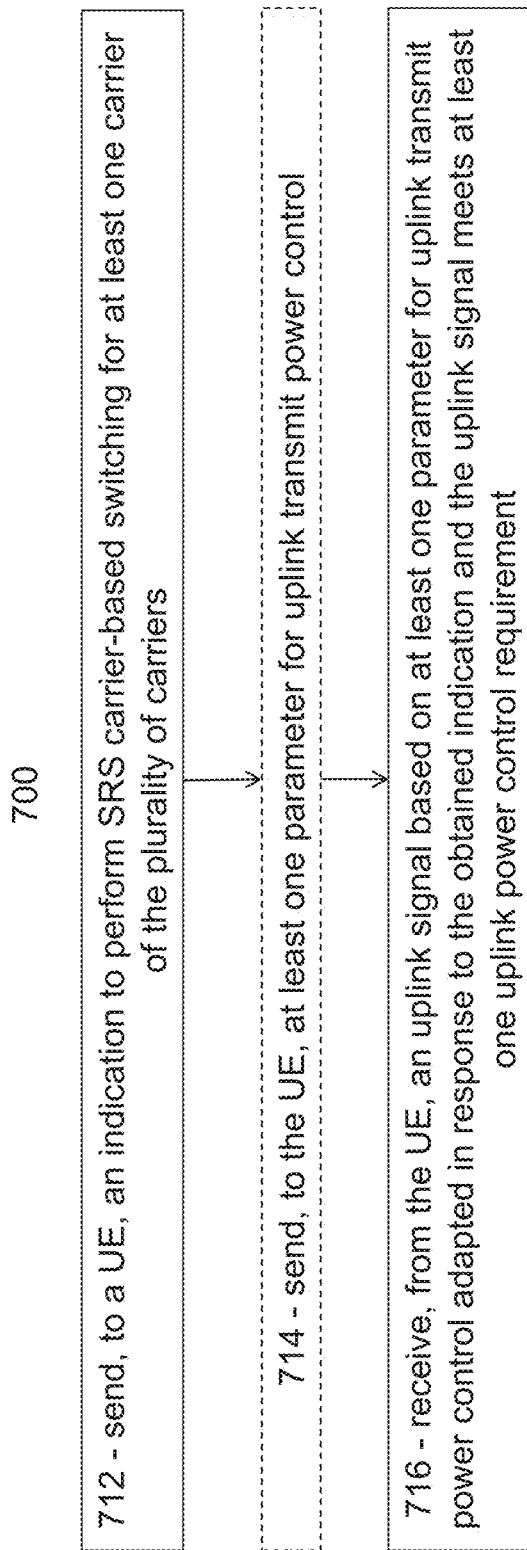
FIG. 7 is a flow diagram illustrating an example method in a network node, according to some embodiments.

The examples described above may be generally represented by the flowcharts in FIG. 6 (with respect to a wireless device) and FIG. 7 (with respect to a network node).

FIG. 6 is a flow diagram illustrating an example method in a UE, according to some embodiments. In particular embodiments, one or more steps of FIG. 6 may be performed by wireless device 110 described with respect to FIG. 4.

The method begins at step 612, where a UE obtains an indication to perform SRS carrier-based switching for at least one carrier of a plurality of carriers. For example wireless device 110 may be operating in carrier aggregation using multiple component carriers. Wireless device 110 may receive an indication from network node 120 to switch to a different component carrier for transmitting SRS (e.g., with respect to FIG. 5, switch from transmitting SRS on component carrier 54a to component carrier 54b). In some embodiments, wireless device 110 may receive the indication via a MAC CE command.

At step 614, the UE adapts at least one parameter for uplink transmit power control in response to the obtained indication. For example, wireless device 110 may adapt any of the power control parameters described in the embodiments above.

As a particular example, the power control parameter may comprise a transmission gap. The transmission gap may normally be set to 20 ms. Wireless device 110 may adapt the parameter to 40 ms when performing SRS carrier-based switching.

At step 616, the UE transmits an uplink signal using the adapted at least one parameter for uplink power control while meeting at least one predetermined uplink power control requirement. For example, wireless device 110 may transmit an uplink signal to meet any of the power control requirements described in the embodiments above.

As a particular example, using the adapted transmission gap parameter of 40 ms, the UE may meet absolute power control requirements when the transmission gap length is greater than 40 ms and meet relative power control requirements when the transmission gap length is less than or equal to 40 ms.

Modifications, additions, or omissions may be made to method 600. Additionally, one or more steps in method 600 of FIG. 6 may be performed in parallel or in any suitable order. The steps of method 600 may be repeated over time as necessary.

FIG. 7 is a flow diagram illustrating an example method in a network node, according to some embodiments. In particular embodiments, one or more steps of FIG. 7 may be performed by network node 120 described with respect to FIG. 4.

The method begins at step 712, where a network node sends, to a UE, an indication to perform SRS carrier-based switching for at least one carrier of the plurality of carriers. For example, network node 120 may send an indication (e.g., a MAC CE command) to wireless device 110 for wireless device 110 to begin transmitting SRS on a different component carrier.

At step 714, the network node sends, to the UE, at least one parameter for uplink transmit power control. For example, network node 120 may send a new transmission gap parameter to wireless device 110.

In some embodiments, network node 120 may send a new transmission gap value of 40 ms. In other embodiments, network node 120 may send transmission gap as a parameter, and the UE is responsible for determining an adapted value for transmission gap.

Other embodiments may skip step 714. For example, the UE may be preconfigured to use a transmission gap of 20 ms until receiving an indication to perform SRS carrier-based switching, at which time the UE is preconfigured to adapt the transmission gap to 40 ms.

At step 716, the network node receives, from the UE, an uplink signal based on at least one parameter for uplink transmit power control adapted in response to the obtained indication and the uplink signal meets at least one uplink power control requirement. For example, network node 120 may receive an uplink signal from wireless device 110 according to the method described in FIG. 6, or any of the other example embodiments described above.

Modifications, additions, or omissions may be made to method 700. Additionally, one or more steps in method 700 of FIG. 7 may be performed in parallel or in any suitable order. The steps of method 700 may be repeated over time as necessary.

Figure 8B:
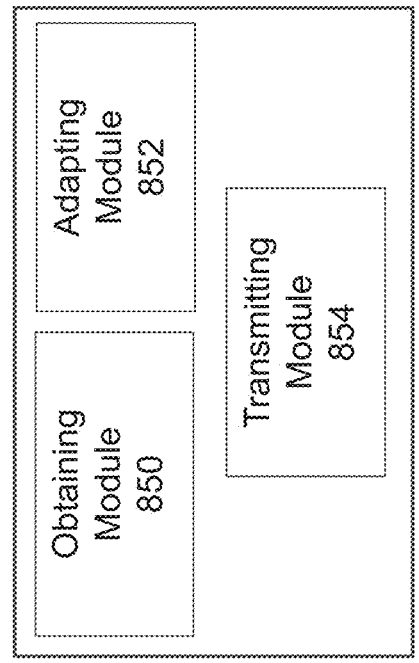
FIG. 8B is a block diagram illustrating example components of a wireless device.
Figure 8A:
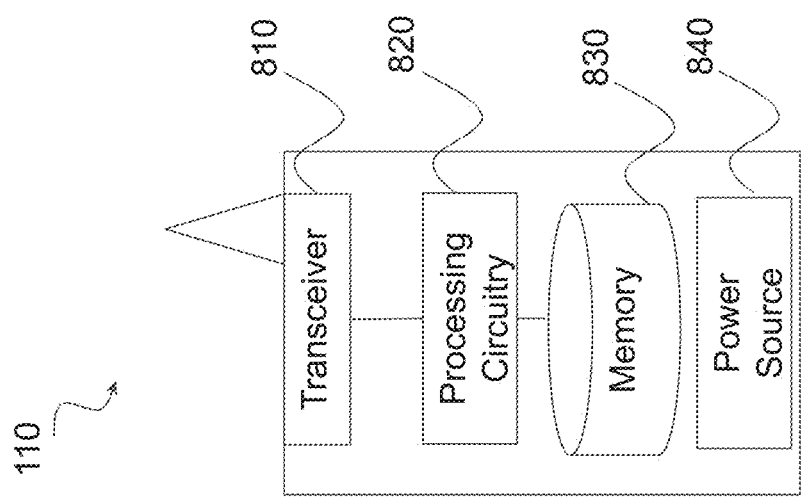
FIG. 8A is a block diagram illustrating an example embodiment of a wireless device.

FIG. 8A is a block diagram illustrating an example embodiment of a wireless device. The wireless device is an example of the wireless devices 110 illustrated in FIG. 4. In particular embodiments, the wireless device is capable of obtaining an indication to perform SRS carrier-based switching for at least one carrier of a plurality of carriers; adapting at least one parameter for uplink transmit power control in response to the obtained indication; and transmitting an uplink signal using the adapted at least one parameter for uplink power control while meeting at least one predetermined uplink power control requirement.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 810, processing circuitry 820, memory 830, and power source 840. In some embodiments, transceiver 810 facilitates transmitting wireless signals to and receiving wireless signals from wireless network node 120 (e.g., via an antenna), processing circuitry 820 executes instructions to provide some or all of the functionality described herein as provided by the wireless device, and memory 830 stores the instructions executed by processing circuitry 820. Power source 840 supplies electrical power to one or more of the components of wireless device 110, such as transceiver 810, processing circuitry 820, and/or memory 830.

Processing circuitry 820 includes any suitable combination of hardware and software implemented in one or more integrated circuits or modules to execute instructions and manipulate data to perform some or all of the described functions of the wireless device. In some embodiments, processing circuitry 820 may include, for example, one or more computers, one more programmable logic devices, one or more central processing units (CPUs), one or more microprocessors, one or more applications, and/or other logic, and/or any suitable combination of the preceding. Processing circuitry 820 may include analog and/or digital circuitry configured to perform some or all of the described functions of wireless device 110. For example, processing circuitry 820 may include resistors, capacitors, inductors, transistors, diodes, and/or any other suitable circuit components.

Memory 830 is generally operable to store computer executable code and data. Examples of memory 830 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 840 is generally operable to supply electrical power to the components of wireless device 110. Power source 840 may include any suitable type of battery, such as lithium-ion, lithium-air, lithium polymer, nickel cadmium, nickel metal hydride, or any other suitable type of battery for supplying power to a wireless device.

In particular embodiments, processing circuitry 820 in communication with transceiver 810 obtains an indication to perform SRS carrier-based switching for at least one carrier of a plurality of carriers; adapts at least one parameter for uplink transmit power control in response to the obtained indication; and transmits an uplink signal using the adapted at least one parameter for uplink power control while meeting at least one predetermined uplink power control requirement.

Other embodiments of the wireless device may include additional components (beyond those shown in FIG. 8A) responsible for providing certain aspects of the wireless device's functionality, including any of the functionality described above and/or any additional functionality (including any functionality necessary to support the solution described above).

FIG. 8B is a block diagram illustrating example components of a wireless device 110. The components may include obtaining module 850, adapting module 852, and transmitting module 854.

Obtaining module 850 may perform the obtaining functions of wireless device 110. For example, obtaining module 850 may receive signaling from network node 120 indicating that wireless device 110 should perform SRS carrier-based switching. In certain embodiments, obtaining module 850 may include or be included in processing circuitry 820. In particular embodiments, obtaining module 850 may communicate with adapting module 852 and transmitting module 854.

Adapting module 852 may perform the adapting functions of wireless device 110. For example, adapting module 852 may adapt a power control parameter according to any of the examples and embodiments described above. In certain embodiments, adapting module 852 may include or be included in processing circuitry 820. In particular embodiments, adapting module 852 may communicate with obtaining module 850 and transmitting module 854.

Transmitting module 854 may perform the transmitting functions of wireless device 110. For example, transmitting module 854 may transmit an uplink signal to network node 120 while meeting power control requirements according to any of the examples or embodiments described above. In certain embodiments, transmitting module 854 may include or be included in processing circuitry 820. In particular embodiments, transmitting module 854 may communicate with obtaining module 850 and adapting module 852.

Figure 9B:
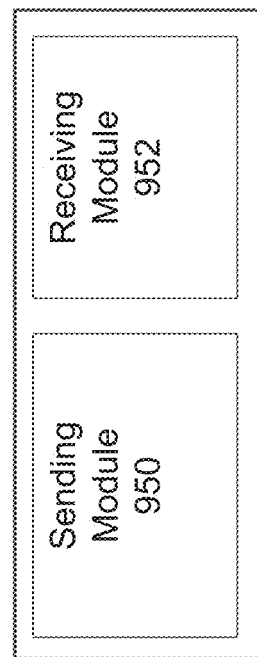
FIG. 9B is a block diagram illustrating example components of a network node.
Figure 9A:
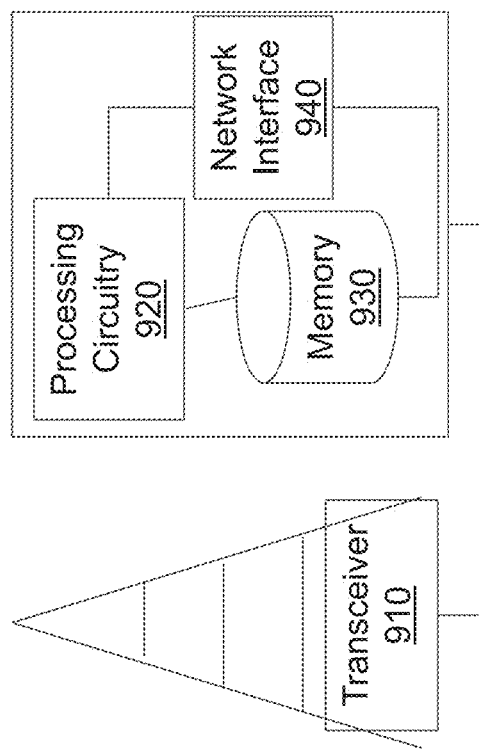
FIG. 9A is a block diagram illustrating an example embodiment of a network node.

FIG. 9A is a block diagram illustrating an example embodiment of a network node. The network node is an example of the network node 120 illustrated in FIG. 4. In particular embodiments, the network node is capable of sending, to a wireless device, an indication to perform SRS carrier-based switching for at least one carrier of a plurality of carriers; and receiving, from the wireless device, an uplink signal based on at least one parameter for uplink transmit power control adapted in response to the sent indication, wherein the uplink signal meets at least one uplink power control requirement.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. The network node includes at least one transceiver 910, at least one processing circuitry 920, at least one memory 930, and at least one network interface 940. Transceiver 910 facilitates transmitting wireless signals to and receiving wireless signals from a wireless device, such as wireless devices 110 (e.g., via an antenna); processing circuitry 920 executes instructions to provide some or all of the functionality described above as being provided by a network node 120; memory 930 stores the instructions executed by processing circuitry 920; and network interface 940 communicates signals to backend network components, such as a gateway, switch, router, Internet, Public Switched Telephone Network (PSTN), controller, and/or other network nodes 120. Processing circuitry 920 and memory 930 can be of the same types as described with respect to processing circuitry 820 and memory 830 of FIG. 8A above.

In some embodiments, network interface 940 is communicatively coupled to processing circuitry 920 and refers to any suitable device operable to receive input for network node 120, send output from network node 120, perform suitable processing of the input or output or both, communicate to other devices, or any combination of the preceding. Network interface 940 includes appropriate hardware (e.g., port, modem, network interface card, etc.) and software, including protocol conversion and data processing capabilities, to communicate through a network.

In particular embodiments, processing circuitry 920 in communication with transceiver 910 sends an indication to perform SRS carrier-based switching for at least one carrier of a plurality of carriers; and receives an uplink signal based on at least one parameter for uplink transmit power control adapted in response to the sent indication, wherein the uplink signal meets at least one uplink power control requirement.

Other embodiments of network node 120 include additional components (beyond those shown in FIG. 9A) responsible for providing certain aspects of the network node's functionality, including any of the functionality described above and/or any additional functionality (including any functionality necessary to support the solution described above). The various different types of network nodes may include components having the same physical hardware but configured (e.g., via programming) to support different radio access technologies, or may represent partly or entirely different physical components.

FIG. 9B is a block diagram illustrating example components of a network node 120. The components may include sending module 950 and receiving module 952.

Sending module 950 may perform the sending functions of network node 120. For example, sending module 950 may send an indication to wireless device 110 to perform SRS carrier-based switching for at least one carrier of a plurality of carriers. In certain embodiments, sending module 950 may include or be included in processing circuitry 920. In particular embodiments, sending module 950 may communicate with receiving module 952.

Receiving module 952 may perform the receiving functions of network node 120. For example, receiving module 952 may receive an uplink signal from wireless device 110. In certain embodiments, receiving module 952 may include or be included in processing circuitry 920. In particular embodiments, receiving module 952 may communicate with sending module 950.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP Third Generation Partnership Project
BTS Base Transceiver Station
CA Carrier Aggregation
CC Component Carrier
CCA Clear Channel Assessment
CW Contention Window
D2D Device to Device
DL Downlink
DRS Discovery Signal
eNB eNodeB
FDD Frequency Division Duplex
LAA License Assisted Access
LBT Listen-Before-Talk
LTE Long Term Evolution
MAC Medium Access Control
M2M Machine to Machine
MIMO Multi-Input Multi-Output
MTC Machine Type Communication
NR New Radio
PDSCH Physical Downlink Shared Channel
PUCCH Physical Uplink Control Channel
RAN Radio Access Network
RAT Radio Access Technology
RB Radio Bearer
RBS Radio Base Station
RNC Radio Network Controller
RRC Radio Resource Control
RRH Remote Radio Head
RRU Remote Radio Unit
RSRP Reference Symbol Received Power
RSRQ Reference Symbol Received Quality
SCell Secondary Cell
TDD Time Division Duplex
UE User Equipment
UL Uplink
UTRAN Universal Terrestrial Radio Access Network
WAN Wireless Access Network

The invention claimed is:

1. A method for use in a user equipment (UE) operable to transmit a sounding reference signal (SRS) on a plurality of component carriers (CCs), the method comprising:
obtaining an indication to perform SRS carrier-based switching for at least one secondary cell (Scell) that operates on at least one CC of the plurality of CCs, wherein the at least one CC belongs to an unlicensed spectrum;
adapting at least one parameter for uplink transmit power control in response to the obtained indication, wherein the at least one parameter comprises a transmission gap length associated with the uplink transmit power control; and
transmitting an uplink signal using the adapted at least one parameter for the uplink power control while meeting at least one uplink power control requirement, wherein meeting the at least one uplink power control requirement comprises meeting an absolute power tolerance requirement when the transmission gap length is greater than 40 ms or meeting a relative power tolerance requirement when the transmission gap length is less than or equal to 40 ms.

2. The method of claim 1 wherein the at least one parameter further comprises at least one of an uplink power control step power value, an uplink power control step time value, an absolute transmit power, a relative transmit power, and a reference for determining SRS transmission power.

3. The method of claim 1 wherein meeting the at least one uplink power control requirement further comprises meeting at least one of an aggregate power control requirement, an uplink power control accuracy requirement, an output power dynamics requirement, a transmission mask requirement, a minimum output power requirement, a transmit power setting accuracy requirement in the UE, and a minimum or maximum transmit power adjustment over a single step or a period of time.

4. The method of claim 1, further comprising obtaining an extra indication that a listen-before-talk (LBT) procedure is used in an uplink or downlink, wherein adapting the at least one parameter for uplink transmit power control is further based on the extra indication that the LBT procedure is used in the uplink or downlink.

5. The method of claim 4, wherein:
the extra indication that the LBT procedure is used in the uplink or downlink applies to a particular LBT carrier of the plurality of CCs; and adapting the at least one parameter for uplink transmit power control is further based on whether the at least one CC for SRS carrier-based switching is the same as the particular LBT carrier.

6. The method of claim 1 wherein:
the at least one CC of the plurality of CCs comprises one or more time division duplex (TDD) CCs; and
performing the SRS carrier-based switching for the at least one Scell that operates on the at least one CC of the plurality of CCs comprises switching SBS transmission between the one or more TDD CCs.

7. The method of claim 1 wherein
the at least one CC of the plurality of CCs comprises one or more TDD CCs; and
performing the SRS carrier-based switching for the at least one Scell that operates on the at least one CC of the plurality of CCs comprises switching SBS transmission to the one or more TDD CCs.

8. The method of claim 1 wherein adapting the transmission gap length associated with the uplink transmit power control is based on a comparison of a threshold and a time period of performing the SRS carrier-based switching.

9. The method of claim 1 wherein the uplink transmit power control includes controlling one or more of a total transmit power of the plurality of CCs, an average transmit power of the at least one CC, a total transmit power of the at least one CC, a transmit power per CC of the plurality of CCs, and a transmit power for uplink transmissions.

10. The method of claim 1 wherein the at least one parameter for uplink transmit power control is based on one or more configuration aspects of the SRS carrier-based switching, the one or more configuration aspects comprising at least one of:
(a) whether the SRS carrier-based switching is performed or not;
(b) a number of CCs of the plurality of CCs, on which the SRS carrier-based switching is performed;
(c) a time period, during which the SRS carrier-based switching is performed for the number of CCs;
(d) a length of a single performance of the SRS carrier-based switching;
(e) an SRS carrier-based switching rate;
(f) a length of a single SRS carrier-based switching loop;
(g) a maximum or a minimum length of a single performance of the SRS carrier-based switching;
(h) a subframe type for an SRS transmission;
(i) a length of the SRS transmission;
(j) a reference for determining SRS transmission power; and
(k) a characteristic for transmission preceding the SRS carrier-based switching on the first CC of the CCs.

11. A method for use in a network node operable to receive a sounding reference signal (SRS) on a plurality of component carriers (CCs), the method comprising:
sending, to a user equipment (UE), an indication to perform SRS carrier-based switching for at least one secondary cell (Scell) that operates on at least one CC of the plurality of CCs, wherein the at least one CC belongs to an unlicensed spectrum; and
receiving, from the UE, an uplink signal based on at least one parameter for uplink transmit power control adapted in response to the sent indication, wherein:
the at least one parameter for uplink transmit power control adapted in response to the sent indication comprises a transmission gap length associated with the uplink transmit power control; and
the uplink signal at least meets an absolute power tolerance requirement when the transmission gap length is greater than 40 ms or at least meets a relative power tolerance requirement when the transmission gap length is less than or equal to 40 ms.

12. The method of claim 11 wherein the at least one parameter for uplink transmit power control adapted in response to the sent indication further comprises at least one of an uplink power control step power value, an uplink power control step time value, an absolute transmit power, a relative transmit power, and a reference for determining SRS transmission power.

13. The method of claim 11 wherein the uplink signal received from the UE further meets at least one of an aggregate power control requirement, an uplink power control accuracy requirement, an output power dynamics requirement, a transmission mask requirement, a minimum output power requirement, a transmit power setting accuracy requirement in the UE, and minimum or maximum transmit power adjustment over a single step or a period of time.

14. The method of claim 11 wherein the at least one parameter for the uplink transmit power control is further adapted in response to an extra indication that a listen-before-talk (LBT) procedure is used an uplink or downlink.

15. The method of claim 14 wherein:
the extra indication that the LBT procedure is used in the uplink or downlink applies to a particular LBT carrier of the plurality of CCs; and
the at least one parameter for the uplink transmit power control is further adapted in response to whether the at least one CC for SRS carrier-based switching is the same as the particular LBT carrier.

16. The method of claim 11 wherein:
the at least one CC of the plurality of CCs comprises one or more time division duplex (TDD) CCs; and
performing the SRS carrier-based switching for the at least one Scell that operates on the at least one CC of the plurality of CCs comprises switching SBS transmission between the one or more TDD CCs.

17. The method of claim 11 wherein:
the at least one CC of the plurality of CCs comprises one or more TDD CCs; and
performing the SRS carrier-based switching for the at least one Scell that operates on the at least one CC of the plurality of CCs comprises switching SBS transmission to the one or more TDD CCs.

18. The method of claim 11 wherein the transmission gap length associated with the uplink transmit power control is adapted in response to a comparison of a threshold and a time period of performing the SRS carrier-based switching.

19. The method of claim 11 wherein the uplink transmit power control includes controlling one or more of a total transmit power of the plurality of CCs, an average transmit power of the at least one CC, a total transmit power of the at least one CC, a transmit power per CC of the plurality of CCs, and a transmit power for uplink transmissions.

20. The method of claim 11 wherein the at least one parameter for uplink transmit power control adapted in response to the sent indication is based on one or more configuration aspects of the SRS carrier-based switching, the one or more configuration aspects comprising at least one of:
(a) whether the SRS carrier-based switching is performed or not;
(b) a number of CCs of the plurality of CCs, on which the SRS carrier-based switching is performed;

(c) a time period, during which the SRS carrier-based switching is performed for the number of CCs;
(d) a length of a single performance of the SRS carrier-based switching;
(e) an SRS carrier-based switching rate;
(f) a length of a single SRS carrier-based switching loop;
(g) a maximum or a minimum length of a single performance of the SRS carrier-based switching;
(h) a subframe type for an SRS transmission;
(i) a length of the SRS transmission;
(j) a reference for determining SRS transmission power; and
(k) a characteristic for transmission preceding the SRS carrier-based switching on the first CC of the CCs.

21. The method of claim 11 further comprising sending, to the UE, the at least one parameter for the uplink transmit power control.

22. A user equipment (UE) operable to transmit a sounding reference signal (SRS) on a plurality of component carriers (CCs), the UE comprising a memory coupled to a processor, the processor operable to:
obtain an indication to perform SRS carrier-based switching for at least one secondary cell (Scell) that operates on at least one CC of the plurality of CCs, wherein the at least one CC belongs to an unlicensed spectrum;
adapt at least one parameter for uplink transmit power control in response to the obtained indication, wherein the at least one parameter comprises a transmission gap length associated with the uplink transmit power control; and
transmit an uplink signal using the at least one parameter for the uplink power control while meeting at least one uplink power control requirement, wherein meeting the at least one uplink power control requirement comprises meeting an absolute power tolerance requirement when the transmission gap length is greater than 40 ms or meeting a relative power tolerance requirement when the transmission gap length is less than or equal to 40 ms.

23. A network node operable to receive a sounding reference signal (SRS) on a plurality of component carriers (CCs), the network node comprising a memory coupled to a processor, the processor operable to:
send, to a user equipment (UE), an indication to perform SRS carrier-based switching for at least one secondary cell (Scell) that operates on at least one CC of the plurality of CCs, wherein the at least one CC belongs to an unlicensed spectrum; and
receive, from the UE, an uplink signal based on at least one parameter for uplink transmit power control adapted in response to the sent indication, wherein:
the at least one parameter for uplink transmit power control adapted in response to the sent indication comprises a transmission gap length associated with the uplink transmit power control; and
the uplink signal at least meets an absolute power tolerance requirement when the transmission gap length is greater than 40 ms or at least meets a relative power tolerance requirement when the transmission gap length is less than or equal to 40 ms.

* * * * *

UNITED STATES PATENT AND TRADEMARK OFFICE
CERTIFICATE OF CORRECTION

| | |
|---|---|
| PATENT NO. | : 11,877,246 B2 |
| APPLICATION NO. | : 17/874586 |
| DATED | : January 16, 2024 |
| INVENTOR(S) | : Rahman et al. |

It is certified that error appears in the above-identified patent and that said Letters Patent is hereby corrected as shown below:

In the Specification

In Column 10, Line 8, delete "SG," and insert -- 5G, --, therefor.

In Column 10, Line 33, delete "communication (M2M)," and insert -- (M2M) communication, --, therefor.

In Column 10, Line 35, delete "equipped" and insert -- equipment --, therefor.

In Column 13, Line 62, delete "an" and insert -- can --, therefor.

In Column 20, Line 17, delete "(i)" and insert -- (j) --, therefor.

In Column 20, Line 19, delete "(j)" and insert -- (k) --, therefor.

In Column 21, Line 13, delete "(8-1)" and insert -- (8-2) --, therefor.

In Column 24, Line 54, delete "type" and insert -- type communication --, therefor.

In Column 26, Line 28, delete "RF" and insert -- radio --, therefor.

In Column 27, Line 58, delete "Discovery Signal" and insert -- Discovery Reference Signal --, therefor.

In Column 28, Line 19, delete "Wireless Access" and insert -- Wide Area --, therefor.

In the Claims

In Column 30, Line 25, in Claim 14, delete "used" and insert -- used in --, therefor.

Signed and Sealed this
Twenty-first Day of May, 2024

Katherine Kelly Vidal
*Director of the United States Patent and Trademark Office*